(12) United States Patent
Koda

(10) Patent No.: US 8,493,825 B2
(45) Date of Patent: Jul. 23, 2013

(54) PORTABLE INFORMATION PROCESSING APPARATUS, INFORMATION PROCESSING METHOD FOR PORTABLE INFORMATION PROCESSING APPARATUS, AND PROGRAM

(75) Inventor: Tomohiro Koda, Tokyo (JP)

(73) Assignee: Sony Corporation, Tokyo (JP)

( * ) Notice: Subject to any disclaimer, the term of this patent is extended or adjusted under 35 U.S.C. 154(b) by 2038 days.

(21) Appl. No.: 11/321,883

(22) Filed: Dec. 30, 2005

(65) Prior Publication Data

US 2006/0164937 A1 Jul. 27, 2006

(30) Foreign Application Priority Data

Jan. 17, 2005 (JP) ................................ 2005-008529

(51) Int. Cl.
*G11B 5/09* (2006.01)
(52) U.S. Cl.
USPC ........................................................ 369/47.1
(58) Field of Classification Search
None
See application file for complete search history.

(56) References Cited

U.S. PATENT DOCUMENTS

2002/0031057 A1* 3/2002 Koyata et al. .............. 369/30.07

FOREIGN PATENT DOCUMENTS

| JP | 6-295228 | 10/1994 |
|----|----------|---------|
| JP | 7-244568 | 9/1995 |
| JP | 10-289084 | 10/1998 |
| JP | 11-45165 | 2/1999 |
| JP | 2004-272574 | 9/2004 |

* cited by examiner

*Primary Examiner* — William C Vaughn, Jr.
*Assistant Examiner* — Daniel Tekle
(74) *Attorney, Agent, or Firm* — Oblon, Spivak, McClelland, Maier & Nuestadt, L.L.P.

(57) ABSTRACT

An information processing apparatus including a display input device in which an image display unit and an operation input unit are integrally formed includes reproduction means for reproducing data recorded on a recording medium, storage means for storing defining data reproduced from the recording medium and defining an operation of the display input device, display control means for controlling the image display unit to display an operator in accordance with the defining data stored in the storage means, determining means for determining an operator for which an operation is input in accordance with an input content input from the operation input unit and a display content displayed on the image display unit, and operation content reading means for reading an operation content of the information processing apparatus stored in the storage means and defined for each operator in accordance with a determination result of the determining means.

10 Claims, 23 Drawing Sheets

FIG. 3

KEY INFORMATION FILE

| INDEX NUMBER | TRACK NUMBER | KEY FUNCTION | DESIGN | POSITION | SOUND | CONDITION | KEYWORD |
|---|---|---|---|---|---|---|---|
| 0 | disc | Play | a0.bmp | (Xa0, Ya0) | a0.snd | Nothing | Nothing |
|  |  | Stop | b0.bmp | (Xb0, Yb0) | b0.snd |  |  |
|  |  | Pause | c0.bmp | (Xc0, Yc0) | c0.snd |  |  |
| 1 | Track#1 | Play | a1.bmp | (Xa1, Ya1) | a1.snd | Nothing | Nothing |
|  |  | Stop | b1.bmp | (Xb1, Yb1) | b1.snd |  |  |
|  |  | Pause | c1.bmp | (Xc1, Yc1) | c1.snd |  |  |
| 2 | Track#2 | Play | a2.bmp | (Xa2, Ya2) | a2.snd | Nothing | Nothing |
|  |  | Stop | b2.bmp | (Xb2, Yb2) | b2.snd |  |  |
|  |  | Pause | c2.bmp | (Xc2, Yc2) | c2.snd |  |  |
| 3 | Track#3 | Play | a3.bmp | (Xa3, Ya3) | a3.snd |  | Nothing |
|  |  | Stop | b3-1.bmp | (Xb3-1, Yb3-1) | b3-1.snd | 1~50s |  |
|  |  | Stop | b3-2.bmp | (Xb3-2, Yb3-2) | b3-2.snd | 50~90s |  |
|  |  | Pause | c2.bmp | (Xc3, Yc3) | c2.snd | Nothing |  |
| ... | ... | ... | ... | ... | ... | ... | ... |
| n | Track#n | Play | an.bmp | (Xan-1, Yan-1) | a2.snd | Nothing | Nothing |
|  |  | Stop | bn.bmp | (Xbn-1, Ybn-1) | b2.snd |  |  |
|  |  | Pause | cn.bmp | (Xcn-1, Ycn-1) | c2.snd |  |  |
| N1 | Track#1 | Play | a1-1.bmp | (Xa1-1, Ya1-1) | a1-1.snd | T>25°C | Nothing |
|  |  | Stop | b1-1.bmp | (Xb1-1, Yb1-1) | b1-1.snd |  |  |
|  |  | Pause | c1-1.bmp | (Xc1-1, Yc1-1) | c1-1.snd |  |  |
| N2 | Track#2 | Play | a2-1.bmp | (Xa2-1, Ya2-1) | a2-1.snd | Nothing | key1 |
|  |  | Stop | b2-1.bmp | (Xb2-1, Yb2-1) | b2-1.snd |  |  |
|  |  | Pause | c2-1.bmp | (Xc2-1, Yc2-1) | c2-1.snd |  |  |

FIG. 9

| | | | 282 |
|---|---|---|---|
| | SCREEN ELEMENT INFORMATION FILE | | |
| SCREEN ELEMENT INFORMATION (301) | PRIORITY LEVEL | FUNCTION | SCREEN ELEMENT IMAGE FILE NAME |
| | 1 | Play/Stop | F1. bmp |
| | 2 | Volume | F2. bmp |
| | 3 | Fast Forward/Rewind | F3. bmp |
| | 4 | Pause | F4. bmp |
| | 5 | Repeat/Shuffle | F5. bmp |
| | 6 | Sound Effect | F6. bmp |
| | 7 | Menu | F7. bmp |
| | 8 | Brightness | F8. bmp |
| ARRANGEMENT INFORMATION (302) | SCREEN FRAME SIZE (NUMBER OF COLUMNS, NUMBER OF ROWS) | SCREEN ARRANGEMENT | |
| | (2, 4) | (8, 5, 4, 1, 3, 2, 7, 6) | |
| | (2, 2) | (2, 1, 3, 4, 6, 5, 8, 7) | |
| | (....) | (....................) | |

2 × 4 VIRTUAL SCREEN ARRANGEMENT

SCREEN FRAME (2 × 2),
ARRANGEMENT INFORMATION
(2, 2),
(2, 1, 3, 4, 6, 5, 8, 7)

2 × 4 VIRTUAL SCREEN ARRANGEMENT

SCREEN FRAME(2 × 2),
ARRANGEMENT INFORMATION
(2, 2),
(2, 1, 3, 4, 6, 5, 8, 7)

2 × 4 VIRTUAL SCREEN ARRANGEMENT

SCREEN FRAME(2 × 2),
ARRANGEMENT INFORMATION
(2, 2),
(2, 1, 3, 4, 6, 5, 8, 7)

DISPLAY AREA ON 1 × 1 REAL SCREEN

1 × 8 VIRTUAL SCREEN ARRANGEMENT

SCREEN FRAME (1 × 1), NO ARRANGEMENT INFORMATION

DISPLAY PRIORITY LEVEL 1

DISPLAY PRIORITY LEVEL 2

DISPLAY PRIORITY LEVEL 3

DISPLAY PRIORITY LEVEL 4

DISPLAY PRIORITY LEVEL 5

DISPLAY PRIORITY LEVEL 6

DISPLAY PRIORITY LEVEL 7

DISPLAY PRIORITY LEVEL 8

2 × 4 REAL SCREEN

DISPLAY AREA ON 2 × 4 REAL SCREEN

SCREEN FRAME Type 1(2 × 4),
ARRANGEMENT INFORMATION
(2, 4),
(8, 5, 4, 1, 3, 2, 7, 6)

PORTABLE INFORMATION PROCESSING APPARATUS, INFORMATION PROCESSING METHOD FOR PORTABLE INFORMATION PROCESSING APPARATUS, AND PROGRAM

CROSS REFERENCES TO RELATED APPLICATIONS

The present invention contains subject matter related to Japanese Patent Application JP 2005-008529 filed in the Japanese Patent Office on Jan. 17, 2005, the entire contents of which are incorporated herein by reference.

BACKGROUND OF THE INVENTION

1. Field of the Invention

The present invention relates to a configuration of an operation input unit used for issuing an instruction to reproduce data recorded on a recording medium, the configuration being suitable for reproduction data in accordance with the data recorded on the recording medium.

2. Description of the Related Art

A voice guidance communication terminal apparatus that displays a layout unique to each voice guidance service by providing layouts corresponding to respective voice guidance services is proposed, for example, in Japanese Unexamined Patent Application Publication No. 2000-165521.

In portable information processing apparatuses, such as general portable compact disc (CD) players, however, the arrangement and design of an operation unit used for inputting an operation are fixed in terms of hardware. Thus, the layout of the operation unit is not variable.

SUMMARY OF THE INVENTION

In portable information processing apparatuses, such as portable CD players, a dynamic change in an operation unit is desired. However, since the operation unit used for inputting an operation is fixed in terms of hardware, a dynamic change in the operation unit is not realized.

It is desirable to allow an image used for inputting an operation to be dynamically displayed on a display unit of a portable information processing apparatus.

An information processing apparatus according to an embodiment of the present invention including a display input device in which an image display unit and an operation input unit are integrally formed includes reproduction means for reproducing data recorded on a recording medium, storage means for storing defining data that is reproduced from the recording medium and that defines an operation of the display input device, display control means for controlling the image display unit to display an operator in accordance with the defining data stored in the storage means, determining means for determining an operator for which an operation is input in accordance with an input content input from the operation input unit and a display content displayed on the image display unit, and operation content reading means for reading an operation content of the information processing apparatus that is stored in the storage means and that is defined for each operator in accordance with a determination result of the determining means.

The operation content of the information processing apparatus may be data for controlling processing of the data recorded on the recording medium.

Operator image data that is recorded on the recording medium and that is to be displayed on the image display unit may be read and displayed.

A portable information processing apparatus according to an embodiment of the present invention that performs processing based on information recorded on a recording medium includes a touch panel that receives an input user operation; a display unit that is provided so as to be superimposed over the touch panel; first reading means for reading from the recording medium a screen element information file including a first table in which data identifying a plurality of screen element image files each indicating a screen element, processing data indicating processing corresponding to the respective plurality of screen element image files, and priority levels of the respective plurality of screen element image files are associated with each other and a second table in which a plurality of sizes of the display unit and arrangements of images of the screen element image files on the display unit corresponding to the priority levels are associated with each other; determining means for determining an arrangement of the images of the screen element image files on the display unit in accordance with the second table included in the screen element information file read by the first reading means and for determining screen element image files to be newly read in accordance with the first table; second reading means for reading from the recording medium the screen element image files determined by the determining means in accordance with the data identifying the screen element image files in the first table; generating means for arranging the screen element image files read by the second reading means in accordance with the arrangement of the images of the screen element image files on the display unit determined by the determining means and for generating display image data to be displayed on the display unit; and display control means for controlling the display unit to display images based on the display image data generated by the generating means.

When an operation input for scrolling an image of a screen element image file included in the images displayed on the display unit is received by the touch panel, the determining means may determine screen element image files to be newly read in accordance with the first table read by the first reading means, the second reading means may read from the recording medium the screen element image files determined by the determining means as screen element image files to be newly read in accordance with the data identifying the screen element image files in the first table, the generating means may generate display image data to be displayed on the display unit using the screen element image files read by the second reading means in accordance with the arrangement of the images of the screen element image files on the display unit determined by the determining means, and the display control means may control the display unit to display images based on the display image data generated by the generating means.

An information processing method according to an embodiment of the present invention for a portable information processing apparatus that performs processing based on information recorded on a recording medium and that includes a touch panel receiving an input user operation and a display unit provided so as to be superimposed over the touch panel includes the steps of reading from the recording medium a screen element information file including a first table in which data identifying a plurality of screen element image files each indicating a screen element, processing data indicating processing corresponding to the respective plurality of screen element image files, and priority levels of the respective plurality of screen element image files are associated with each other and a second table in which a plurality of sizes of the display unit and arrangements of images of the screen element image files on the display unit corresponding to the priority levels are associated with each other; determining an arrangement of the images of the screen element image files on the display unit in accordance with the second table included in the screen element information file read by the step of reading the screen element information file; determining screen element image files to be newly read in accordance with the first table; reading from the recording medium the screen element image files determined by the step of determining the screen element image files to be newly read in accordance with the data identifying the screen element image files in the first table; generating display image data to be displayed on the display unit by arranging the screen element image files read by the step of reading the screen element image files determined by the step of determining the screen element image files to be newly read in accordance with the arrangement of the images of the screen element image files on the display unit determined by the step of determining the arrangement of the images of the screen element image files on the display unit; and controlling the display unit to display images based on the display image data generated by the step of generating the display image data.

BRIEF DESCRIPTION OF THE DRAWINGS

FIG. 3 illustrates data included in a key information file shown in FIG. 2;

FIG. 9 illustrates data included in a screen element information file shown in FIG. 8;

DESCRIPTION OF THE PREFERRED EMBODIMENTS

Figure 1:
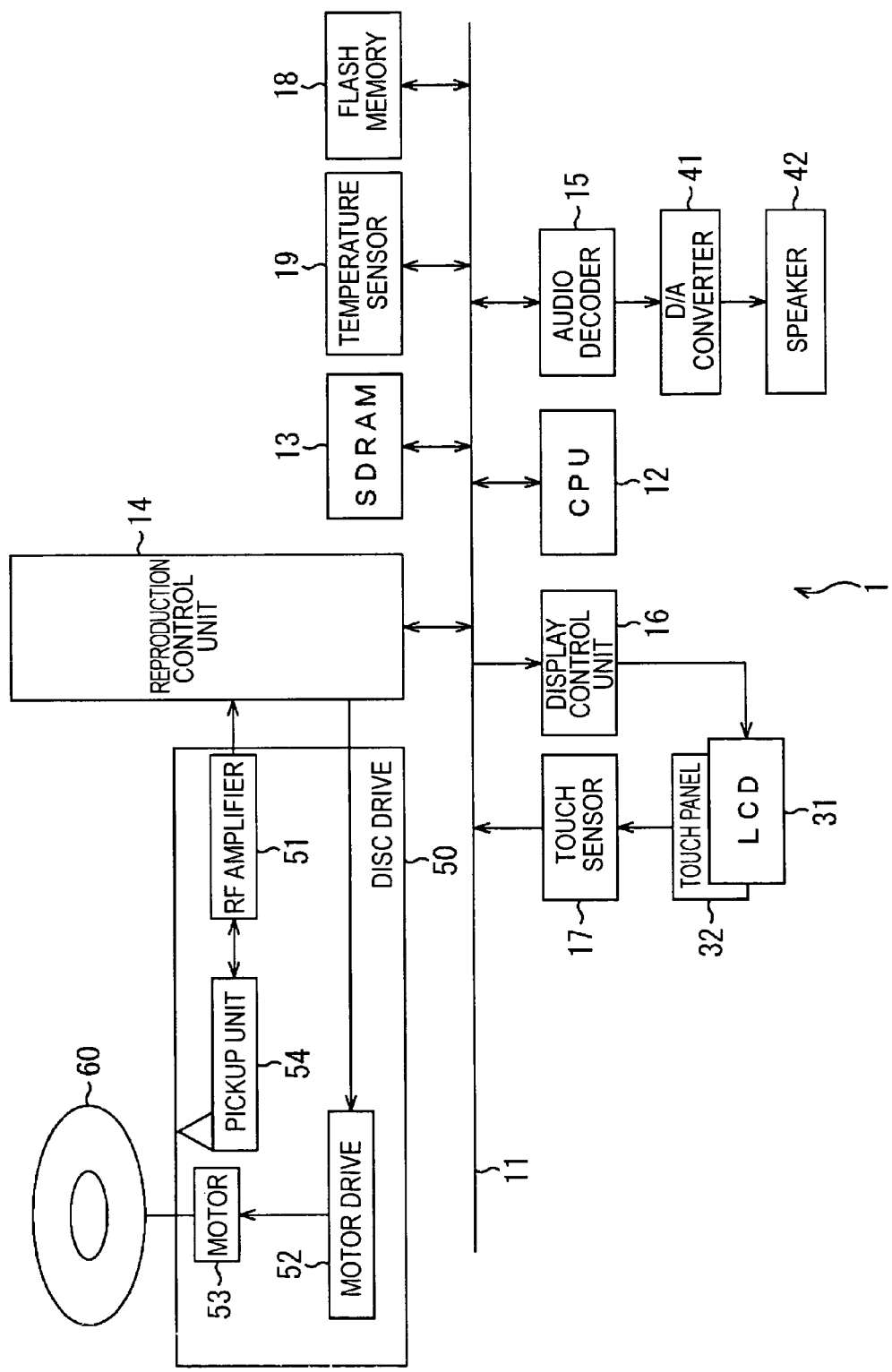
FIG. 1 is a block diagram showing an example of the structure of a portable information processing apparatus according to an embodiment of the present invention.

FIG. 1 is a block diagram showing an example of the structure of a portable information processing apparatus 1 according to a first embodiment of the present invention. The portable information processing apparatus 1 is, for example, a CD player. In the first embodiment, an optical disc 60 is used as a recording medium.

Referring to FIG. 1, a central processing unit (CPU) 12, a synchronous dynamic random-access memory (SDRAM) 13, a reproduction control unit 14, an audio decoder 15, a display control unit 16, a touch sensor 17, a flash memory 18, and a temperature sensor 19 are connected to a data bus 11 of the portable information processing apparatus 1.

The CPU 12 controls each unit connected via the data bus 11. The CPU 12 also generates display image data in accordance with key information file, which will be described below with reference to FIG. 3, read from the optical disc 60 and stored in the SDRAM 13. The SDRAM 13 stores therein data necessary for the portable information processing apparatus 1 to perform processing. For example, the SDRAM 13 stores therein data read from the optical disc 60 and supplied from the reproduction control unit 14 via the data bus 11. In addition, the SDRAM 13 is provided with a storage area used for generating an image to be displayed on a screen of a liquid crystal device (LCD) 31, and data of an image and the like to be displayed on the screen of the LCD 31 are stored in the storage area.

The reproduction control unit 14 is connected to a disc drive 50. The reproduction control unit 14 controls reproduction of the optical disc 60 via the disc drive 50. For example, the reproduction control unit 14 instructs the disc drive 50 to reproduce the optical disc 60 in accordance with an instruction from the CPU 12, and acquires reproduction data (audio data or the like) of the optical disc 60 supplied from the disc drive 50.

The audio decoder 15 decodes encoded audio data. For example, the audio decoder 15 decodes encoded audio data (a music file (for example, a music file 83-1, which will be described below with reference to FIG. 2) recorded on the optical disc 60) supplied from the reproduction control unit 14 via the data bus 11. In addition, the audio decoder 15 is connected to a digital-to-analog (D/A) converter 41. The D/A converter 41 is connected to a speaker 42. The D/A converter 41 converts audio data (digital data) decoded by the audio decoder 15 into analog audio data, and outputs the converted analog audio data to the speaker 42. The speaker 42 outputs sound based on the analog audio data.

The display control unit 16 controls display on the LCD 31, which functions as a display unit. For example, the display control unit 16 controls display on the LCD 31 such that an image based on data supplied from the reproduction control unit 14 via the data bus 11 is displayed. The LCD 31 displays an image under the control of the display control unit 16. A touch panel 32 is superimposed over the LCD 31. In other words, the LCD 31 and the touch panel 32 are integrated with each other. The touch sensor 17 detects an operation input to the touch panel 32, and supplies a corresponding signal to the CPU 12 via the data bus 11.

Information, such as the number of reproduction times of data (for example, data of a music file) stored on the optical disc 60, is stored in the flash memory 18. The temperature sensor 19 detects (senses) the temperature of the air in which the portable information processing apparatus 1 is provided, and supplies the detected temperature to the CPU 12 via the data bus 11.

The disc drive 50 reads data recorded on the optical disc 60 under the control of the reproduction control unit 14.

More specifically, the disc drive 50 includes a radio-frequency (RF) amplifier 51, a motor drive 52, a motor 53, and a pickup unit 54. The disc drive 50 causes the motor 53 to rotate the optical disc 60 mounted on a turntable (not shown). The motor drive 52 drives the motor 53 under the control of the reproduction control unit 14. The pickup unit 54 emits a laser beam to the optical disc 60 to read data recorded on the optical disc 60, and supplies the read data to the RF amplifier 51.

Information recorded on the optical disc 60 shown in FIG. 1 is described next with reference to FIG. 2.

Figure 2:
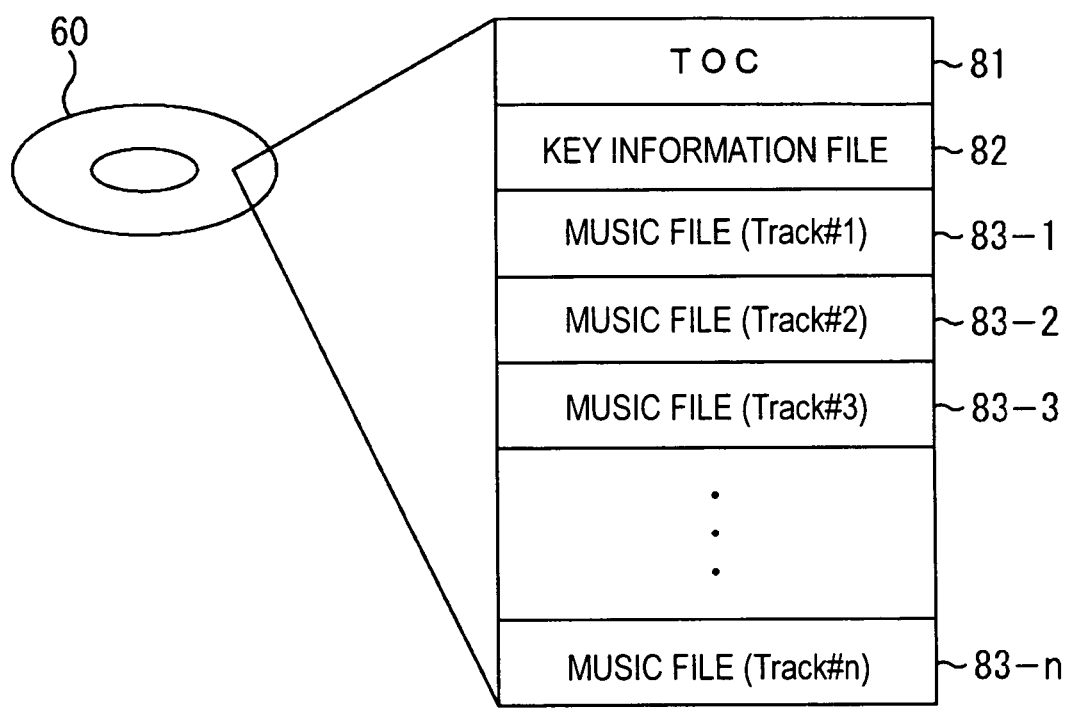
FIG. 2 illustrates an example of information recorded on an optical disc shown in FIG. 1.

A table of contents (TOC) 81, a key information file 82, and music files 83-1 to 83-*n* (n is a natural number) are recorded on the optical disc 60 shown in FIG. 2.

The TOC 81 is a list of information recorded on the optical disc 60. For example, the TOC 81 is recorded on the innermost circumference of the optical disc 60. The key information file 82 is a file in which information for displaying an icon (operation key) for an operation on the LCD 31 (see FIG. 1), which function as a display unit, is written. In the first embodiment, the TOC 81 and the key information file 82 are recorded on the optical disc 60 in association with each other. For example, when the TOC 81 is read from the optical disc 60, the key information file 82 is also read. The music files 83-1 to 83-*n* correspond to music data for respective pieces of music (respective tracks). In the example shown in FIG. 2, track#1 corresponds to the music file 83-1, track#2 corresponds to the music file 83-2, track#3 corresponds to the music file 83-3, and track#*n* corresponds to the music file 83-*n*. In other words, when the music file 83-1 is read, a single piece of music (a track), that is, track#1 is reproduced.

As described above, the key information file 82 is included as part of disc contents information recorded on the optical disc 60.

A detailed example of the key information file 82 is described next with reference to FIG. 3.

A table in which an index number, a track number, a key function, a design, a position, sound (operation sound), a condition, and a keyword are associated with each other is included in the key information file 82 shown in FIG. 3. Such information can be stored in a method defined based on, for example, specifications of the optical disc 60.

For an index number "0", "disc" as a track number, "Play", "Stop", and "Pause" as key functions (data indicating processing corresponding to respective pieces of image data), "a0.bmp", "b0.bmp", and "c0.bmp" as designs (image data) corresponding to the respective key functions, "(Xa0, Ya0)", "(Xb0, Yb0)", and "(Xc0, Yc0)" as information on positions in which the respective designs are disposed (positional data indicating positions on the LCD 31 in which images of the respective pieces of image data are displayed), "a0.snd", "b0.snd", and "c0.snd" as sound corresponding to the respective key functions (music data reproduced when the respective pieces of image data are selected), "Nothing" as a condition for displaying the images of the respective image data (a condition for displaying the images), and "Nothing" as a keyword (a condition for displaying the images) are associated with each other.

The index number "0" corresponds to a default condition in which no track is reproduced. In other words, the index number "0" corresponds to a case where the optical disc 60 is mounted on the disc drive 50 (see FIG. 1) and no track (music file) is reproduced. Thus, in this case, "disc" is set as a track number. The key functions indicate functions of keys (for example, icons displayed on the LCD 31 in FIG. 1). In this example, "Play", "Stop", and "Pause" are set as key functions. The designs indicate images (image files) of corresponding key functions. In other words, a file of image data of a key (icon) displayed on the LCD 31 is associated with a key function. In the example shown in FIG. 3, the key function "Play" corresponds to the design "a0.bmp", the key function "Stop" corresponds to the design "b0.bmp", and the key function "Pause" corresponds to the design "c0.bmp". In addition, the positions indicate positional information for displaying the corresponding pieces of image data on the screen of the LCD 31 using coordinates represented by X (a horizontal axis) and Y (a vertical axis). In the example shown in FIG. 3, the design "a0.bmp" corresponds to the position "(Xa0, Ya0)", the design "b0.bmp" corresponds to the position "(Xb0, Yb0)", and the design "c0.bmp" corresponds to the position "(Xc0, Yc0)". In addition, the sound indicates sound data (sound files) of operation sound of the corresponding key functions. In other words, data on sound output when a key (icon) displayed on the LCD 31 is selected is associated with a key function. In the example shown in FIG. 3, the key function "Play" corresponds to the sound "a0.snd", the key function "Stop" corresponds to the sound "b0.snd", and the key function "Pause" corresponds to the sound "c0.snd". The condition indicates a condition for displaying the corresponding images (keys) and sound. In the example shown in FIG. 3, "Nothing" is set as a condition for displaying the corresponding keys (images of the keys). The keyword indicates a word for using an index when a keyword that is equal to a keyword set in advance is input. In the example shown in FIG. 3, "Nothing" is set as a keyword. For example, a content provider sets the keyword. A user is able to display an icon (key) corresponding to a set keyword by acquiring the keyword from the content provider. In other words, a keyword also serves as a condition for display.

An index number "1" corresponds to a state in which track#1 (in the example shown in FIG. 2, the music file 83-1) is being reproduced. In other words, information used for display (output) when the music file 83-1 corresponding to track#1 is being reproduced is stored in the index number "1". Since descriptions of a key function, a design, sound, and a condition are similar to the case for the index number "0", the descriptions are omitted here. In addition, descriptions for the index number "2" are similar to the case for the index number "1", the descriptions are omitted here.

An index number "3" corresponds to a state in which track#3 (in the example shown in FIG. 2, the music file 83-3) is being reproduced. In other words, information used for display (output) when the music file 83-3 corresponding to track#3 is being reproduced is stored in the index number "3". Here, different designs, sound, and conditions are provided for the key function "Stop". More specifically, when a range between 1 and 50 seconds is set as a condition, a design "b3-1.bmp", a position "(Xb3-1, Yb3-1)", and sound "b3-

1.snd" correspond to the key function "Stop". When a range between 50 and 90 seconds is set as a condition, a design "b3-2.bmp", a position "(Xb3-2, Yb3-2)", and sound "b3-2.snd" correspond to the key function "Stop". In other words, when the first 50 seconds of track#3 is being reproduced, an image file of the design "b3-1.bmp" is displayed in the position "(Xb3-1, Yb3-1)" on the screen of the LCD 31, and the sound file "b3-1.snd" is output as sound when this image file (icon) is selected. When the next 40 seconds of track#3 is being reproduced, an image file of the design "b3-2.bmp" is displayed in the position "(Xb3-2, Yb3-2)" on the screen of the LCD 31, and the sound file "b3-2.snd" is output as sound when this image file (icon) is selected. Since descriptions of other items are similar to the case for the index number "1", the descriptions are omitted here.

An index number "N1" corresponds to a state in which track#1 (in the example shown in FIG. 2, the music file 83-1) is being reproduced. Here, "T>25° C." is set as a condition. This means that track#1 is reproduced using information on the index number "N1" when the temperature detected by the temperature sensor 19 shown in FIG. 1 is higher than 25° C. Since descriptions of a key function, a design, sound, and a keyword are similar to the case for the index number "1", the descriptions are omitted here.

An index number "N2" corresponds to a state in which track#2 (in the example shown in FIG. 2, the music file 83-2) is being reproduced. Here, "key1" is set as a keyword. This means that track#2 is reproduced using information on the index number "2" when "key1" is input by the user using the touch panel 32 as a keyword. Since descriptions of a key function, a design, sound, and a condition are similar to the case for the index number "1", the descriptions are omitted here.

As described above, a table in which an index number, a track number, a key function, a design, sound, a condition, and a keyword are associated with each other is included in the key information file 82.

An extension of an image file corresponding to a design of a key (icon) is not necessarily limited to "bmp". In addition, an extension of a sound file corresponding to sound is not necessarily limited to "snd".

Figure 4:
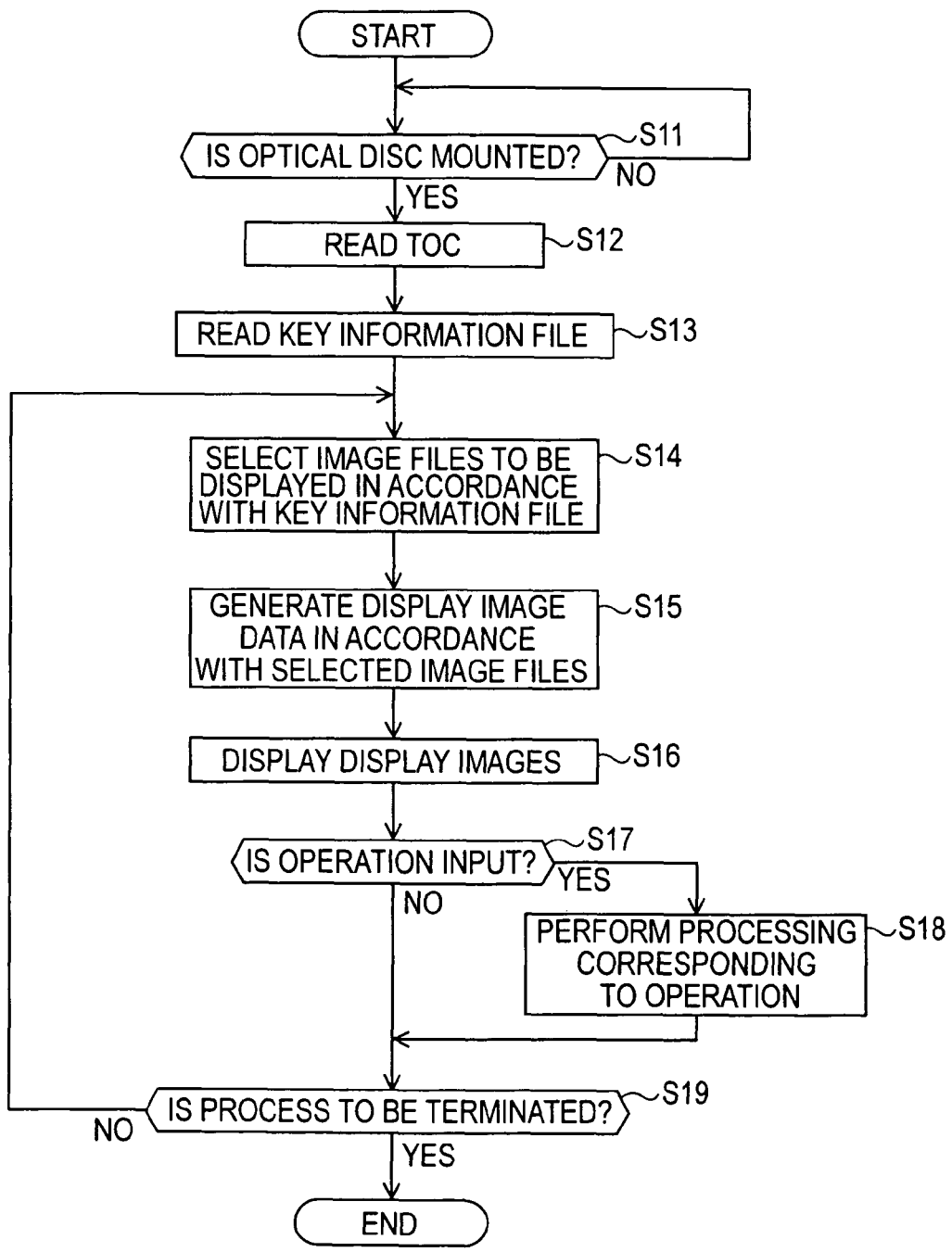
FIG. 4 is a flowchart of a display process performed by the portable information processing apparatus shown in FIG. 1.

A display process performed by the portable information processing apparatus 1 is described next with reference to a flowchart shown in FIG. 4. This process starts when the power of the portable information processing apparatus 1 is turned on.

In step S11, the CPU 12 determines via the data bus 11 and the reproduction control unit 14 whether or not the optical disc 60 is mounted on the disc drive 50. The CPU 12 waits until the optical disc 60 is mounted.

If it is determined in step S11 that the optical disc 60 is mounted, the reproduction control unit 14 controls the disc drive 50 to read the TOC 81 (see FIG. 2) recorded on the optical disc 60 in step S12. The reproduction control unit 14 supplies the read TOC 81 to the SDRAM 13 via the data bus 11, and causes the SDRAM 13 to store therein the TOC 81.

In step S13, the reproduction control unit 14 reads the key information file 82 recorded (in association with the TOC 81) on the optical disc 60. More specifically, the reproduction control unit 14 reads the key information file 82, which is associated with the TOC 81, from the optical disc 60 under the control of the CPU 12. The reproduction control unit 14 supplies the read key information file 82 to the SDRAM 13 via the data bus 11, and causes the SDRAM 13 to store therein the key information file 82. As described above, since the TOC 81 and the key information file 82 are associated with each other, when the TOC 81 is read, the key information file 82 is also read and stored (held) in the SDRAM 13.

In step S14, the CPU 12 selects image files to be displayed in accordance with the key information file 82 stored in the SDRAM 13. For example, in the first processing of step S14, the CPU 12 selects three image files, that is, "a0.bmp", "b0.bmp", and "c0.bmp", corresponding to the index number "0" shown in FIG. 3. In other words, the CPU 12 selects image files corresponding to an index number that satisfies a condition in the key information file 82 (table) shown in FIG. 3 as image files to be displayed.

As described above, image files of keys (icons) that satisfy a condition are selected in accordance with the read key information file 82. If a single index number corresponds to a predetermined track number, key information corresponding to the index number (image files of the corresponding index number) is used. However, if a plurality of index numbers correspond to a predetermined track number, in other words, if a plurality of types of key information is set for a single track number (for example, in the example shown in FIG. 3, the index numbers "1" and "N1" correspond to track#1), the CPU 12 refers to conditions corresponding to the respective index numbers, and selects image files in accordance with the conditions. If a plurality of types of key information is set even though conditions are not particularly given, the CPU 12 selects key information at random.

In step S15, the CPU 12 generates display images in accordance with the selected image files. In this example, the CPU 12 arranges the image files "a0.bmp", "b0.bmp", and "c0.bmp" in accordance with the corresponding positional information "(Xa0, Ya0)", "(Xb0, Yb0)", and "(Xc0, Yc0)" to generate display images (display image data). More specifically, on the assumption of a virtual screen of the LCD 31, the CPU 12 loads the image files "a0.bmp", "b0.bmp", and "c0.bmp" to the positions "(Xa0, Ya0)", "(Xb0, Yb0)", and "(Xc0, Yc0)", respectively, and combines these image files to generate data of display images to be displayed on the screen of the LCD 31. The CPU 12 supplies the generated display image data to the display control unit 16 via the data bus 11.

In step S16, the display control unit 16 controls the images based on the display image data supplied from the CPU 12 via the data bus 11 to be displayed on the screen of the LCD 31. By this processing, for example, images shown in FIG. 5 are displayed on the screen of the LCD 31.

Figure 5:
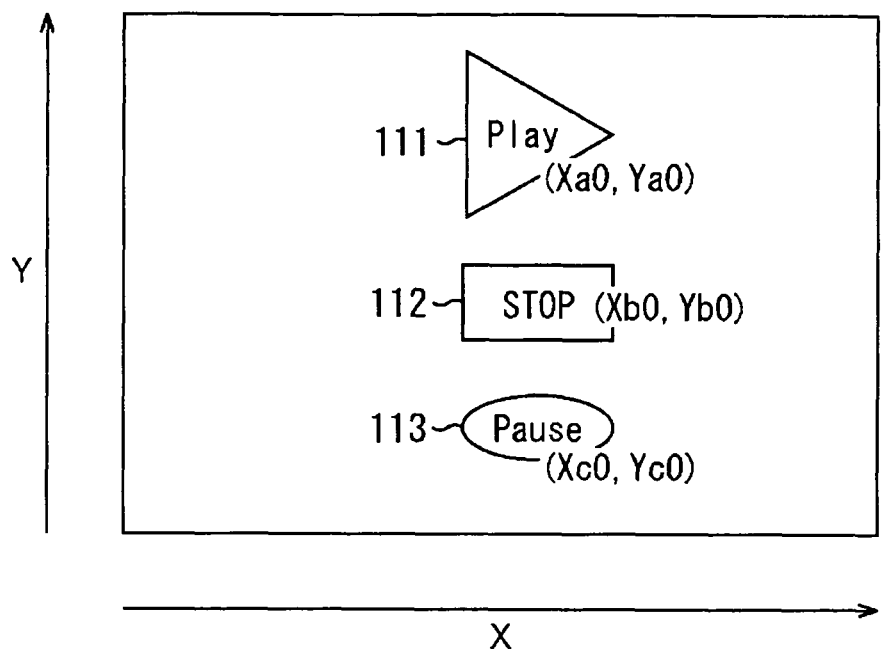
FIG. 5 shows an example of a screen displayed on an LCD shown in FIG. 1.

In the example shown in FIG. 5, an icon (operation key) 111 indicated as "Play", an icon 112 indicated as "STOP", and an icon 113 indicated as "Pause" are displayed on the screen of the LCD 31. For example, the icon ill is based on "a0.bmp" corresponding to the key function "Play" of the index number "0" in FIG. 3, the icon 112 is based on "b0.bmp" corresponding to the key function "Stop" of the index number "0", and the icon 113 is based on "c0.bmp" corresponding to the key function "Pause" of the index number "0". In addition, on the screen of the LCD 31, the center coordinates of the icon 111 are (Xa0, Ya0), the center coordinates of the icon 112 are (Xb0, Yb0), and the center coordinates of the icon 113 are (Xc0, Yc0).

In step S17, the touch sensor 17 determines whether or not a user operation is input. More specifically, when the user selects an icon displayed on the screen of the LCD 31 using his/her finger or a touch pen, the touch sensor 17 detects the selection via the touch panel 32.

If it is determined in step S17 that a user operation is input, the process proceeds to step S18. In step S18, the CPU 12 performs processing corresponding to the operation. More specifically, if a user operation is input, the touch sensor 17 reports the icon selected by the user to the CPU 12 via the data bus 11. For example, when the icon 111 is selected, that is, when an icon corresponding to "Play" is selected, the CPU 12 causes sound corresponding to "Play" to be output and causes reproduction of a track (music data) designated to be reproduced to start. In the first processing of step S18, since it is in the initial state (a state of the index number "0"), sound corresponding to "disc" (sound corresponding to "a0.snd") is output. Then, reproduction of the music file 83-1 starts. More specifically, under the control of the CPU 12, the file "a0.snd" is decoded by the audio decoder 15, digital-to-analog converted by the D/A converter 41, and output via the speaker 42. Then, the reproduction control unit 14 reads the music file 83-1 from the optical disc 60. The read music file 83-1 is decoded by the audio decoder 15, digital-to-analog converted by the D/A converter 41, and output via the speaker 42. For example, when the icon 112 is selected, that is, when an icon corresponding to "Stop" is selected, the CPU 12 causes the audio decoder 15 to decode the file "b0.snd", causes the D/A converter 41 to digital-to-analog convert the decoded file, and causes the speaker 42 to output the converted file. Then, the CPU 12 causes reproduction of a track (music data) being reproduced to stop. For example, when the icon 113 is selected, that is, when an icon corresponding to "Pause" is selected, the CPU 12 causes the audio decoder 15 to decode the file "c0.snd", causes the D/A converter 41 to digital-to-analog convert the decoded file, and causes the speaker 42 to output the converted file. Then, the CPU 12 causes reproduction of a track (music data) being reproduced to pause.

As described above, an image used for inputting an operation can be displayed on the screen of the LCD 31 of the portable information processing apparatus 1.

If it is determined in step S17 that no operation is input, the processing in step S18 is skipped.

If it is determined in step S17 that no operation is input or after the processing in step S18 is performed, the process proceeds to step S19. In step S19, the CPU 12 determines whether or not to terminate the process. For example, when the user instructs to turn off the power or when reproduction of all the music files 83 recorded on the optical disc 60 is completed, the CPU 12 determines that the process is to be terminated. If it is determined in step S19 that the process is to be terminated, the process is terminated. If it is determined in step S19 that the process is not to be terminated, the process returns to step S14, and the subsequent processing is repeated. More specifically, image files to be displayed are selected in accordance with the key information file 82, and display image data is generated and displayed. For example, when the music file 83-1 corresponding to track#1 is reproduced in the second processing, display image data is generated in accordance with designs and positional information corresponding to respective key functions of the index number "1" shown in FIG. 3, and the display images are displayed on the screen of the LCD 31. At this time, if the temperature sensor 19 of the portable information processing apparatus 1 measures a temperature higher than 25° C., display images are generated in accordance with key information of the index number "N1", and the generated display images are displayed. Then, similar processing is repeated.

As described above, since the key information file 82 in which designs and sound of keys are set corresponding to a track number (index number) being reproduced is recorded on the optical disc 60, icons having different designs depending on the track number (index number) can be displayed as operation keys on the screen of the LCD 31. In addition, since different types of sound are set for the respective displayed icons, when an icon having a design is selected, a corresponding type of sound can be output. Thus, the user is able to enjoy variety in icons and sound.

The index numbers "1", and "N1" correspond to the track number "#1". This means that even for the same track number, conditions are given for using an index number. In this example, when the temperature sensor 19 of the portable information processing apparatus 1 measures a temperature higher than 25° C., key information of the index number "N1" is used. In contrast, when the temperature sensor 19 of the portable information processing apparatus 1 measures a temperature equal to or lower than 25° C., key information of the index number "1" is used. A similar thing applies to a case for the index numbers "2" and "N2". For example, a keyword "key1" is input by a user operation (for example, in step S17), key information of the index number "N2" is used.

Various icons other than icons corresponding to "Play", "Stop", and "Pause" may also be displayed on the LCD 31. In this case, for example, a screen shown in FIG. 6 can be displayed on the LCD 31 by adding items corresponding to functions of various keys to the key functions of the key information file 82 shown in FIG. 3.

Figure 6:
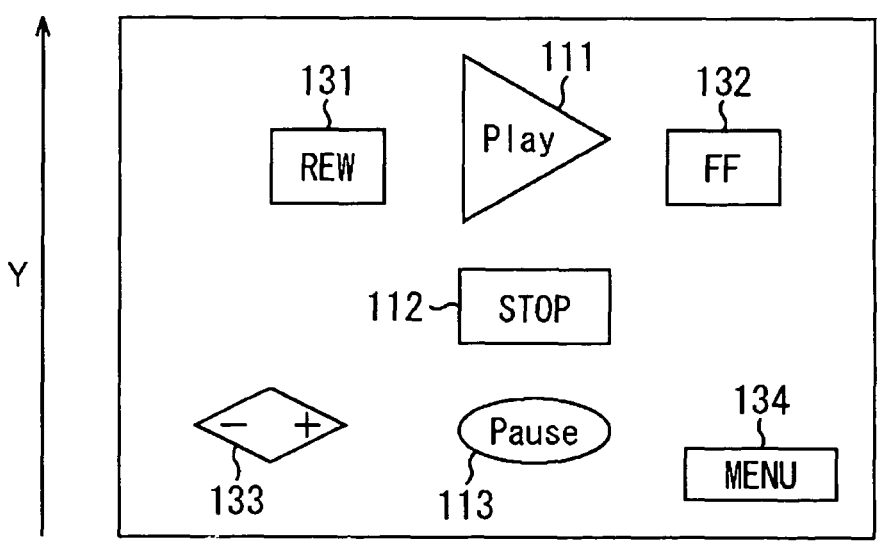
FIG. 6 is another example of a screen displayed on the LCD shown in FIG. 1.

In addition to the icon 111 corresponding to the function of "Play", the icon 112 corresponding to the function of "Stop", and the icon 113 corresponding to the function of "Pause", an icon 131 corresponding to a function of rewind (REW), an icon 132 corresponding to a function of fast forward (FF), an icon 133 corresponding to a function of volume (−, +), and an icon 134 corresponding to a function of menu (MENU) are displayed in FIG. 6.

As described above, since an icon (operation key) used for inputting an operation varies depending on a track number to be reproduced and conditions (a temperature and a keyword) in accordance with the key information file 82, the operation key can be dynamically changed. In other words, an icon used for inputting an operation can be dynamically displayed on the LCD 31 of the portable information processing apparatus 1.

In addition, since an icon (operation key) used for inputting an operation varies depending on a track number to be reproduced and conditions (a temperature and a keyword), the user is able to enjoy variety in icons.

As described above, according to the first embodiment, the portable information processing apparatus 1 including a touch panel interface (the touch panel 32 and the touch sensor 17) reads key functions, key arrangement information (positions), and design information recorded on the optical disc 60, displays operation keys (icons) on the screen of the LCD 31, and receives an operation from a user. Thus, the design of an icon (operation key) can be improved, and the icon can be variably displayed.

In addition, since the key information file 82 is stored on the optical disc 60 in association with the TOC 81, the key information file 82 can be read easily. The key information file 82 may not be associated with the TOC 81 as long as the key information file 82 is recorded as part of disc contents information.

In addition, since the design, arrangement, and the like of an operation key (icon) change in accordance with a reproduction elapsed time of music, an operation system that is more interesting to the user can be realized.

In addition, a user interface (UI) can be changed depending on an optical disc mounted or depending on a piece of music.

In addition, a user interface can be changed in accordance with an environment in which the user uses the user interface.

In addition, a content creator (that is, a provider of the optical disc 60) is able to design and set a user interface suitable for content (in the foregoing embodiment, each track) to be reproduced.

In addition, the number of reproduction times of the optical disc 60 or the number of reproduction times of each track of the optical disc 60 may be recorded in the flash memory 18 shown in FIG. 1. In this case, an icon (operation key) may be variably displayed in accordance with the number of reproduction times.

In addition, although, in the first embodiment, an icon is variably displayed in accordance with conditions, such as a temperature and a keyword, other conditions, such as external environment, may be provided. For example, an icon can be variably displayed by providing conditions, such as humidity, an air pressure, acceleration, microphone sound collection, and camera input.

In addition, although an operation key (icon) and sound (operation sound) can be variably displayed and output in the first embodiment, a background (on the screen of the LCD 31 other than a portion in which an icon is displayed) may be displayed so as to correspond to display of the operation key (icon) and output of the sound (operation sound).

In addition, by using the optical disc 60 as a rewritable recording medium, the key information file 82 may be created, edited, and registered by the user.

In addition, although the optical disc 60 is used as a recording medium in the first embodiment, another type of recording medium may be used as long as the recording medium is capable of recording information. Furthermore, the portable information processing apparatus 1 may be a Mini Disc (MD) (trademark) player, a movie player, a still image player/recorder, or a portable information processing apparatus that reproduces a ROM/RAM disc/silicon memory.

In addition, although an operation for a music file is described in the first embodiment, an operation for a slide show of moving images or still images may also be applied. In this case, an icon is variably displayed in accordance with a reproduction time of a moving image or a still image.

In addition, the user may select an index number of the key information file 82. Thus, the user is able to display a desired icon (key) used for inputting an operation on the LCD 31 when a track is being reproduced.

A second embodiment of the present invention will now be described.

Figure 7:
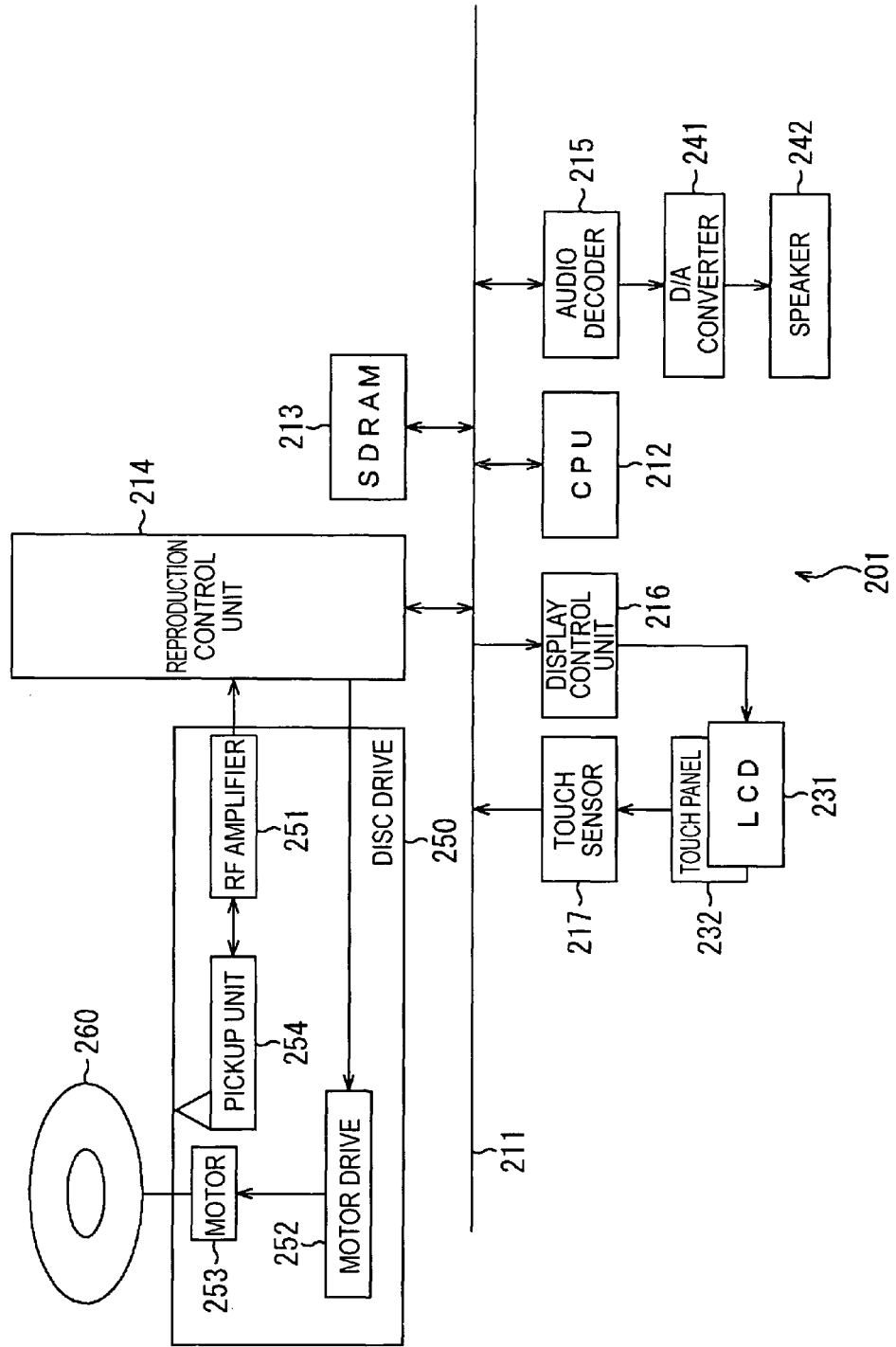
FIG. 7 is a block diagram showing an example of a portable information processing apparatus according to another embodiment of the present invention.

FIG. 7 is a block diagram showing an example of the structure of a portable information processing apparatus according to the second embodiment. As is clear from the comparison of FIG. 7 and FIG. 1, a portable information processing apparatus 201 shown in FIG. 7 has a structure basically similar to that of the portable information processing apparatus 1 shown in FIG. 1.

In other words, similarly to the structure of the portable information processing apparatus 1 shown in FIG. 1 including the data bus 11, the CPU 12, the SDRAM 13, the reproduction control unit 14, the audio decoder 15, the display control unit 16, the touch sensor 17, the LCD 31, the touch panel 32, the D/A converter 41, the speaker 42, and the disc drive 50, the portable information processing apparatus 201 shown in FIG. 7 includes a data bus 211, a CPU 212, an SDRAM 213, a reproduction control unit 214, an audio decoder 215, a display control unit 216, a touch sensor 217, an LCD 231, a touch panel 232, a D/A converter 241, a speaker 242, and a disc drive 250. Each unit having the same name has a corresponding function.

However, since the portable information processing apparatus 201 shown in FIG. 7 does not need the flash memory 18 and the temperature sensor 19 of the portable information processing apparatus 1 shown in FIG. 1, the portable information processing apparatus 201 does not include the flash memory 18 and the temperature sensor 19. In addition, information recorded on an optical disc 260 in the second embodiment is different from information recorded on the optical disc 60 shown in FIG. 1.

In addition, unlike processing performed by the portable information processing apparatus 1 shown in FIG. 1, the CPU 212 selects a screen element image file to be read in accordance with a screen element information file, which will be described below with reference to FIG. 9, read from the optical disc 260 and stored in the SDRAM 213. Then, the CPU 212 generates display image data in accordance with the screen element image file, which will be described below with reference to FIG. 8, read from the optical disc 260 based on the selection and stored in the SDRAM 213 and with a screen element image file read in advance.

Information recorded on the optical disc 260 shown in FIG. 7 is described next with reference to FIG. 8.

Figure 8:
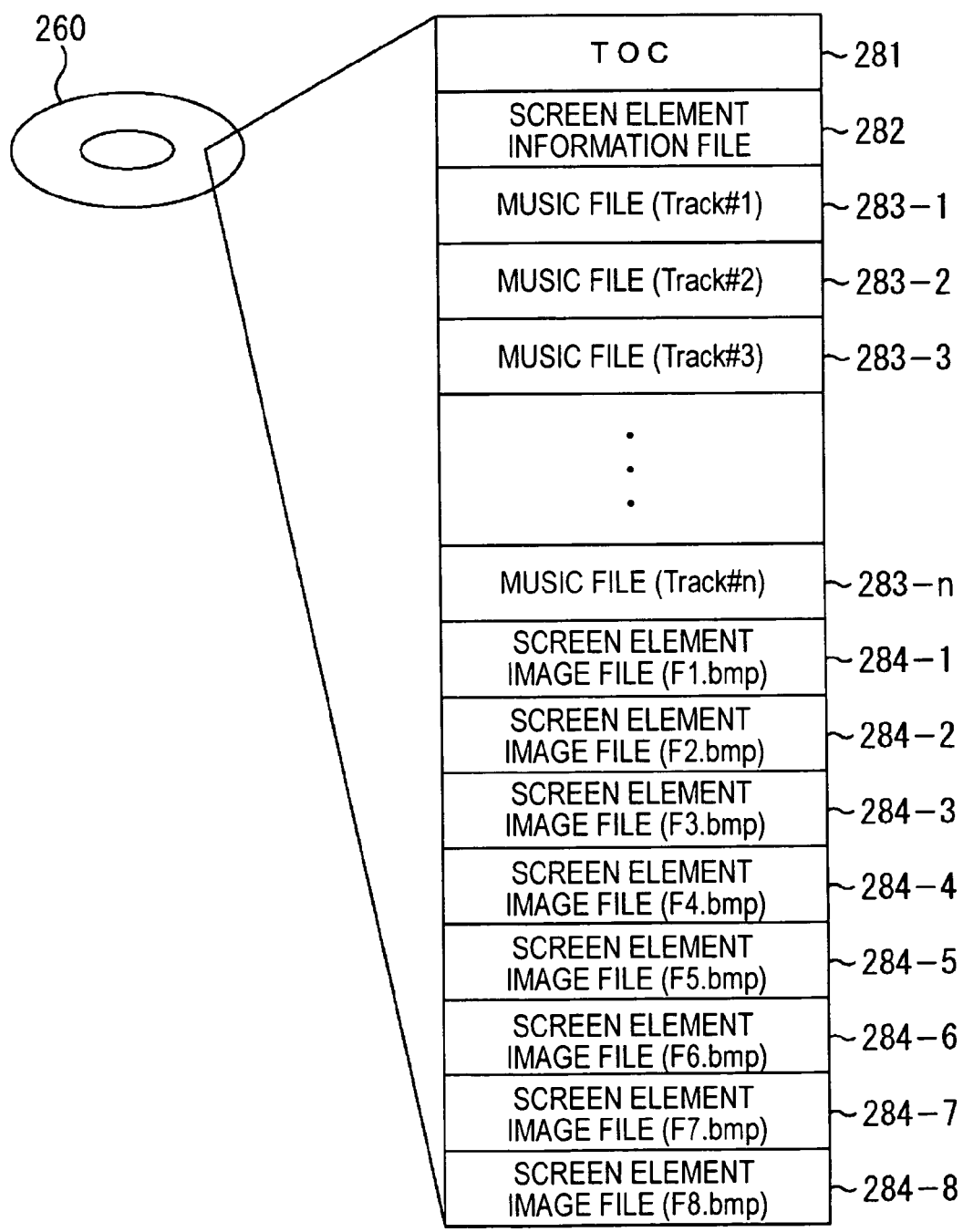
FIG. 8 illustrates an example of information recorded on an optical disc shown in FIG. 7.

A TOC 281, a screen element information file 282, music files 283-1 to 283-*n* (n is a natural number), and screen element image files 284-1 to 284-8 are recorded on the optical disc 260 shown in FIG. 8.

Since the TOC 281 and the music files 283-1 to 283-*n* are similar to the TOC 81 and the music files 83-1 to 83-*n* shown in FIG. 2, descriptions of the TOC 281 and the music files 283-1 to 283-*n* are omitted here.

The screen element information file 282 includes information for displaying an image (for example, an image or an icon displayed on the screen) used for an operation on the screen of the LCD 231 (see FIG. 7), which functions as a display unit.

The screen element image files 284-1 to 284-8 are files of images functioning as elements of a screen displayed in an area of the screen of the LCD 231. In the example shown in FIG. 8, the name of the screen element image file 284-1 is "F1.bmp", the name of the screen element image file 284-2 is "F2.bmp", the name of the screen element image file 284-3 is "F3.bmp", the name of the screen element image file 284-4 is "F4.bmp", the name of the screen element image file 284-5 is "F5.bmp", the name of the screen element image file 284-6 is "F6.bmp", the name of the screen element image file 284-7 is "F7.bmp", and the name of the screen element image file 284-8 is "F8.bmp". In the description below, when the screen element image files 284-1 to 284-8 need not be discriminated from each other, each of the screen element image files 284-1 to 284-8 is simply referred to as a screen element image file 284.

FIG. 9 illustrates a detailed example of the screen element information file 282 shown in FIG. 8. The screen element information file 282 shown in FIG. 9 includes screen element information 301 and arrangement information 302.

The screen element information 301 includes a table in which priority levels of screen element image files, functions corresponding to the respective screen element image files (that is, data indicating processing corresponding to the respective screen element image files), and screen element image file names of eight screen element image files (that is, names of the image files including information functioning as elements of a screen, in other words, data identifying the respective screen element image files) are associated with each other. A priority level indicates a level of priority for displaying a screen element image file corresponding to a screen element image file name. A function indicates processing performed when a screen element image file corresponding to a screen element image file name is displayed on the screen of the LCD 231 and selected (operated).

More specifically, the first-priority screen element image file name is "F1.bmp" and the function of the screen element image file corresponding to the first-priority screen element image file name is "Play/Stop". The second-priority screen element image file name is "F2.bmp" and the function of the screen element image file corresponding to the second-priority screen element image file name is "Volume". The third-priority screen element image file name is "F3.bmp" and the function of the screen element image file corresponding to the third-priority screen element image file name is "Fast Forward/Rewind". The fourth-priority screen element image file name is "F4.bmp" and the function of the screen element image file corresponding to the fourth-priority screen element image file name is "Pause". The fifth-priority screen element image file name is "F5.bmp" and the function of the screen element image file corresponding to the fifth-priority screen element image file name is "Repeat/Shuffle". The sixth-priority screen element image file name is "F6.bmp" and the function of the screen element image file corresponding to the sixth-priority screen element image file name is "Sound Effect". The seventh-priority screen element image file name is "F7.bmp" and the function of the screen element image file corresponding to the seventh-priority screen element image file name is "Menu". The eighth-priority screen element image file name is "F8.bmp" and the function of the screen element image file corresponding to the eighth-priority screen element image file name is "Brightness". The screen element information file 282 does not include the screen element image files 284-1 to 284-8. The screen element information file 282 includes screen element image file names that identify the screen element image files 284-1 to 284-8. In other words, a table in which a function corresponding to a name (for example, "F1.bmp") that identifies a screen element image file and a priority level are defined is included in the screen element information 301.

In addition, a table in which screen frame sizes (that is, sizes of the LCD 231) and screen element arrangements (that is, arrangements of images of screen element image files on the LCD 231 corresponding to priority levels) are associated with each other is included in the arrangement information 302. A screen frame size indicates a size that defines the number of columns and the number of rows. In addition, a screen element arrangement indicates order of screen elements arranged in a corresponding screen frame size in association with priority levels included in the screen element information 301.

For example, when a screen frame size is (2, 4) ("(2, 4)" represents that the number of columns is two and the number of rows is four), screen elements (images) are arranged in a priority order (8, 5, 4, 1, 3, 2, 7, 6) on the screen. More specifically, the screen of the LCD 231 is divided into eight (2×4) regions formed by two columns and four rows, and screen elements (images) are arranged in the divided eight regions in the priority order (8, 5, 4, 1, 3, 2, 7, 6). For example, when a screen frame size is (2, 2) ("(2, 2)" represents that the number of columns is two and the number of rows is two), screen elements (images) are arranged in a priority order (2, 1, 3, 4, 6, 5, 8, 7) on the screen. More specifically, the screen of the LCD 231 is divided into four (2×2) regions formed by two columns and two rows, and screen elements (images) are arranged in the four divided regions and four virtual regions that are not displayed on the screen of the LCD 231 (in this case, since the number of screen elements is eight, the number of left screen elements is four (that is, 8−4=4)) in the priority order (2, 1, 3, 4, 6, 5, 8, 7).

As shown in FIGS. 8 and 9, each of the screen element image files 284-1 to 284-8 shown in FIG. 8 is associated with the screen element information file 282 shown in FIG. 9. More specifically, by referring to a screen element image file name in the screen element information 301 included in the screen element information file 282 shown in FIG. 9, the screen element image file 284-1, 284-2, 284-3, 284-4, 284-5, 284-6, 284-7, or 284-8 can be identified.

For example, in accordance with the screen element information file 282 and the screen element image file 284, which is associated with the screen element information file 282, a screen element image, that is, a so-called icon or the like, used for an operation can be displayed on the screen of the LCD 231. In the second embodiment, the TOC 281 and the screen element information file 282 are recorded on the optical disc 260 in association with each other. For example, when the TOC 281 is read from the optical disc 260, the screen element information file 282 is also read. As described above, the screen element information file 282 is included as part of disc contents information recorded on the optical disc 260.

The information shown in FIG. 8 can be stored in a method defined based on, for example, specifications of the optical disc 260. In addition, the format of the screen element image file 284 is not necessarily limited to a bitmap format.

As described above, the screen element information 301 and the arrangement information 302 are included in the screen element information file 282. In addition, a table in which a screen element image file name, a function, and a priority level are associated with each other is included in the screen element information 301. A table in which a screen frame size and a screen arrangement are associated with each other is included in the arrangement information 302.

An example of an image when each of the screen element image files 284-1 to 284-8 shown in FIG. 8 is developed is described next with reference to FIG. 10.

Figure 10:
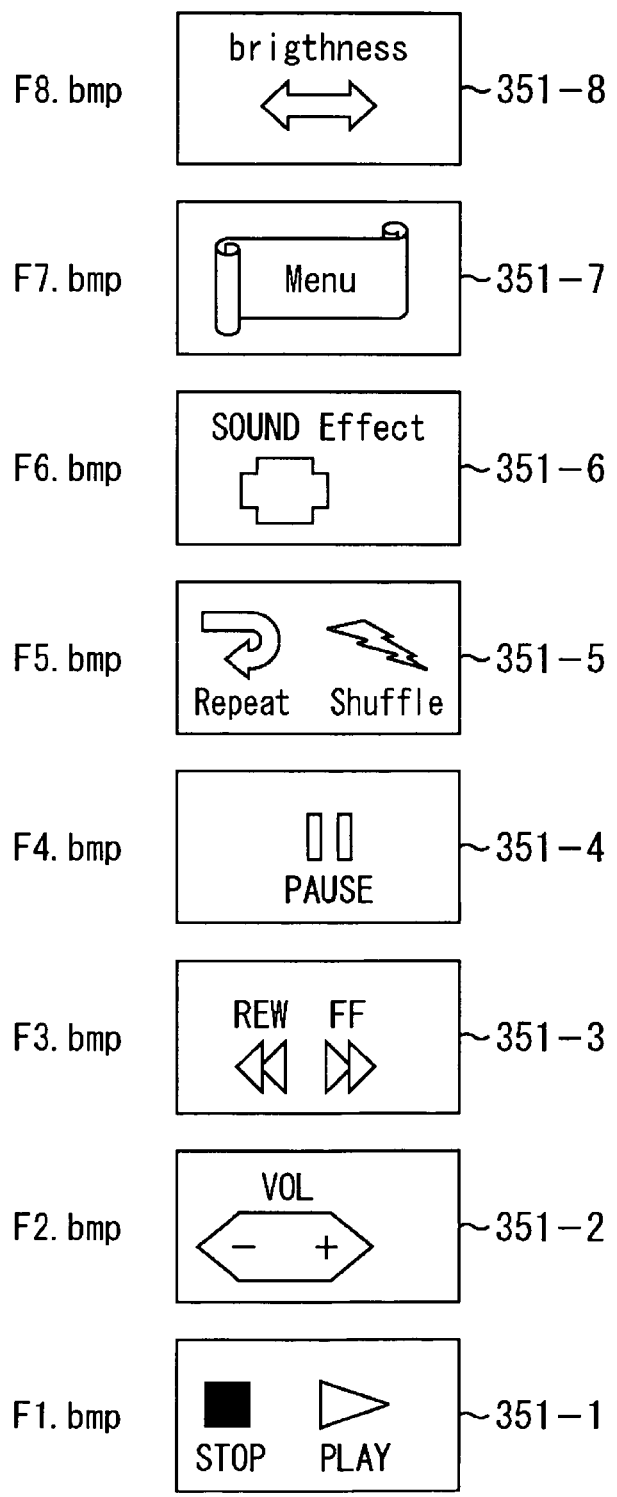
FIG. 10 illustrates examples of screen element images corresponding to screen element image file names shown in FIG. 8.

In FIG. 10, screen element images 351-1 to 351-8 represent images obtained by developing the screen element image files 284-1 to 284-8 shown in FIG. 8. In other words, an image obtained by developing the screen element image file 281-1 (F1.bmp) is the screen element image 351-1. An image obtained by developing the screen element image file 281-2 (F2.bmp) is the screen element image 351-2. An image obtained by developing the screen element image file 281-3 (F3.bmp) is the screen element image 351-3. An image obtained by developing the screen element image file 281-4 (F4.bmp) is the screen element image 351-4. An image obtained by developing the screen element image file 281-5 (F5.bmp) is the screen element image 351-5. An image obtained by developing the screen element image file 281-6 (F6.bmp) is the screen element image 351-6. An image obtained by developing the screen element image file 281-7 (F7.bmp) is the screen element image 351-7. An image obtained by developing the screen element image file 281-8 (F8.bmp) is the screen element image 351-8. In the description below, when the screen element images 351-1 to 351-8 need not be discriminated from each other, each of the screen element images 351-1 to 351-8 is simply referred to as a screen element image 351.

Figure 11:
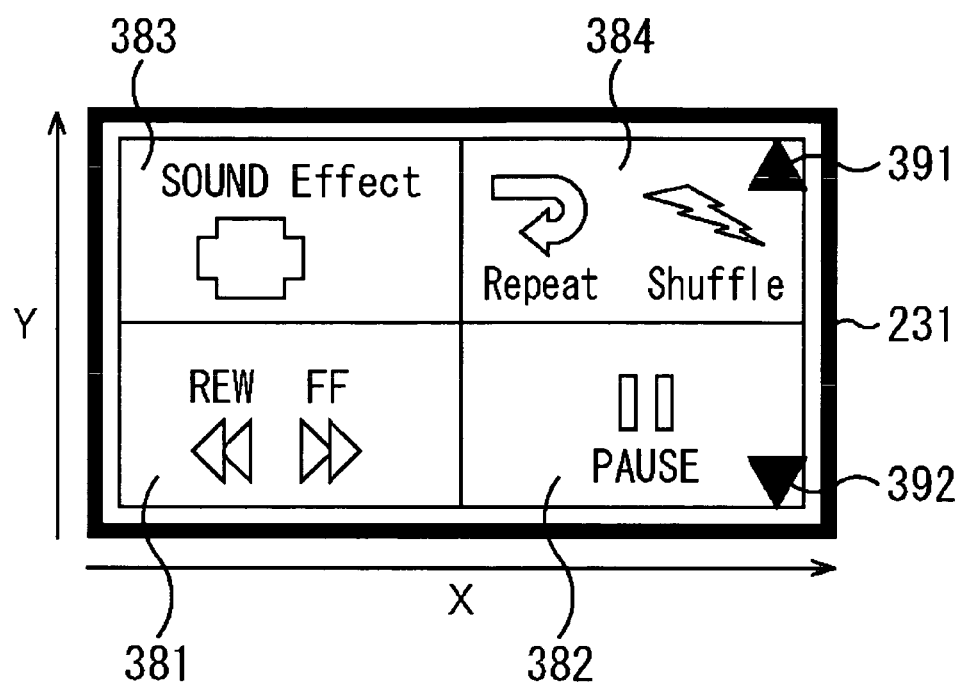
FIG. 11 shows an example of a screen displayed on an LCD shown in FIG. 7.

When the screen of the LCD 231 has a size corresponding to a screen frame size of two columns and two rows, images, for example, shown in FIG. 11 are displayed on the screen of the LCD 231.

In the example shown in FIG. 11, the screen of the LCD 231 is divided into four (2×2) regions, that is, regions 381 to 384. In accordance with screen element image file names included in the screen element information file 282, the corresponding screen element images 351 are loaded into the corresponding regions 381 to 384 and displayed. More specifically, the screen element image 351-3 is displayed in the region 381, the screen element image 351-4 is displayed in the region 382, the screen element image 351-6 is displayed in the region 383, and the screen element image 351-5 is displayed in the region 384. In addition, scroll buttons 391 and 392 are displayed on right portions of the screen of the LCD 231. The scroll button 391 is used for displaying a screen element image virtually located above the screen of the LCD 231. The scroll button 392 is used for displaying a screen element image virtually located below the screen of the LCD 231.

When the user selects (or touches) the touch panel 232 provided so as to be superimposed over the LCD 231, the touch sensor 217 detects a position on the touch panel 232 (for example, a position on the touch panel 232 designated using coordinate axes) that is selected by the user, and reports the detected position to the CPU 212 via the data bus 211. The CPU 212 identifies which region (from among the regions 381 to 384) the position on the screen of the LCD 231 selected by the user belongs to, and detects a screen element image file name of a screen element image displayed in the identified region. The CPU 212 identifies a function corresponding to the detected screen element image file name by referring to the screen element information 301 shown in FIG. 9, and controls each unit to perform processing corresponding to the function. As described above, a screen element image displayed on the screen of the LCD 231 serves as a so-called icon or the like. In other words, when a screen element image displayed on the screen of the LCD 231 is selected, processing of a function that is associated with a screen element image file name corresponding to the screen element image in the table shown in FIG. 9 is performed.

As shown in FIG. 11, images composed of a plurality of screen element images 351 are displayed on the entire screen of the LCD 231. When a displayed screen element image is selected, corresponding processing defined by the screen element information file 282 shown in FIG. 9 is performed.

A display process performed by the portable information processing apparatus 201 shown in FIG. 7 is described next with reference to flowcharts shown in FIGS. 12 and 13. This process starts when the power of the portable information processing apparatus 201 is turned on.

In step S51, the CPU 212 determines whether or not the optical disc 260 is mounted on the disc drive 250 via the data bus 211 and the reproduction control unit 214. The CPU 212 waits until the optical disc 260 is mounted.

If it is determined in step S51 that the optical disc 260 is mounted, the reproduction control unit 214 controls the disc drive 250 to read the TOC 281 (see FIG. 8) recorded on the optical disc 260 in step S52. The reproduction control unit 214 supplies the read TOC 281 to the SDRAM 213 via the data bus 211, and causes the SDRAM 213 to store therein the TOC 281.

In step S53, the reproduction control unit 214 reads the screen element information file 282 recorded (in association with the TOC 281) on the optical disc 260. More specifically, the reproduction control unit 214 reads the screen element information file 282 (that is, the screen element information file 282 associated with the TOC 281), which is described with reference to FIG. 8, from the optical disc 260 under the control of the CPU 212. The reproduction control unit 214 supplies the read screen element information file 282 to the SDRAM 213 via the data bus 211, and causes the SDRAM 213 to store therein the screen element information file 282. As described above, since the TOC 281 and the screen element information file 282 are associated with each other, when the TOC 281 is read, the screen element information file 282 is also read and stored (held) in the SDRAM 213.

In step S54, the CPU 212 refers to the screen element information file 282 stored in the SDRAM 213, and determines a screen frame size for display on the screen of the LCD 231 (an arrangement of images of screen element image files on the LCD 231). More specifically, the CPU 212 determines a screen frame size that can be displayed on the screen of the LCD 231 (of the portable information processing apparatus 201 shown in FIG. 7) in accordance with the arrangement information 302 included in the screen element information file 282 shown in FIG. 9. For example, the CPU 212 refers to the arrangement information 302 included in the screen element information file 282 shown in FIG. 9, and sets a screen frame size (2, 4) in accordance with the size of the screen of the LCD 231, the aspect ratio of the screen of the LCD 231, and the like.

In step S55, the CPU 212 selects (determines) screen element image file names to be newly read in accordance with the screen element information file 282. The CPU 212 determines the screen frame size determined in step S54 and file names of screen element image files (data identifying screen element image files) within the screen frame size in accordance with the priority levels defined in the screen element information 301 included in the screen element information file 282 shown in FIG. 9, and selects (determines) file names of unread screen element image files, from among screen element image files corresponding to the determined screen element image file names, as screen element image file names to be newly read. In the first processing of step S55, since none of the screen element image files shown in FIG. 8 has been read, the CPU 212 determines the screen frame size determined in step S54 and file names of screen element image files within the screen frame size in accordance with the priority levels defined in the screen element information 301 included in the screen element information file 282 shown in FIG. 9, and selects all the determined screen element image file names as file names of screen element image files to be read.

Figure 14:
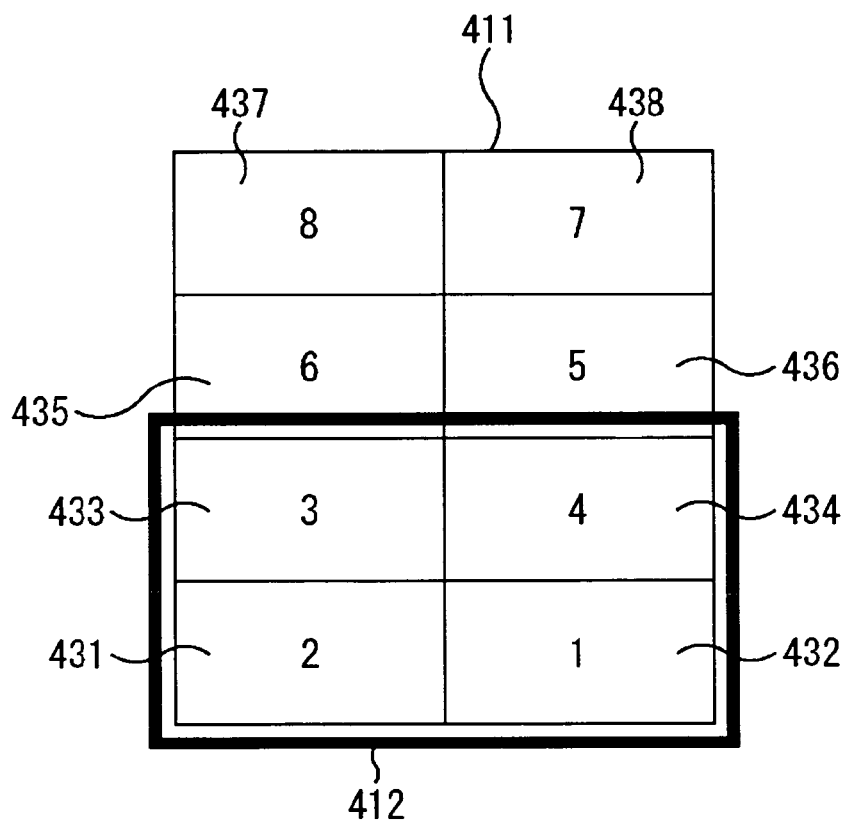
FIG. 14 shows an example of an assumed virtual screen.

For example, when determining the screen frame size (2, 2) in step S54, the CPU 212 assumes a virtual screen 411 shown in FIG. 14. In the example shown in FIG. 14, the CPU 212 applies priority levels shown as a screen arrangement in the screen element information 301 to regions 431 to 438 of the virtual screen 411 having the 2×4 virtual screen arrangement (that is, the virtual screen 411 is divided into eight (2×4) regions 431 to 438) in accordance with the screen frame size (2, 2) in the screen element information 301 shown in FIG. 9. Since an actual display area on the screen of the LCD 231 is (2, 2), a display area on the real screen is provided as a display area 412. In other words, although the virtual screen 411 formed by two columns and four rows is assumed, only the display area 412 is actually displayed on the screen of the LCD 231.

In addition, numbers (2, 1, 3, 4, 6, 5, 8, 7) written in the regions 431 to 438 shown in FIG. 14 are equal to the screen arrangement corresponding to the arrangement (2, 2) shown as the screen arrangement in the arrangement information 301 (see FIG. 9). As described above, the CPU 212 applies the arrangement to the virtual screen 411 from lower left to upper right. By assuming the virtual screen 411 shown in FIG. 14, a screen element image file name of a corresponding priority level can be specified. For example, since the first-priority screen element image file name is "F1.bmp", the CPU 212 identifies "F1.bmp" as a screen element image file name. In the example shown in FIG. 14, in the processing of step S55 shown in FIG. 12, the CPU 212 selects screen element image file names "F1.bmp", "F2.bmp", "F3.bmp", and "F4.bmp" as screen element image file names to be newly read.

Referring back to FIG. 12, in step S56, the reproduction control unit 214 reads from the optical disc 260 the screen element image files 284 of the screen element image file names selected by the CPU 212 in step S55. In the example shown in FIG. 14, since the screen element image file names "F1.bmp", "F2.bmp", "F3.bmp", and "F4.bmp" are selected as the screen element image file names to be newly read, the reproduction control unit 214 reads the screen element image files 284-1 to 284-4 corresponding to the screen element image file names "F1.bmp", "F2.bmp", "F3.bmp", and "F4.bmp", respectively, from the optical disc 260 (see FIG. 8). The reproduction control unit 214 supplies the read screen element image files 284-1 to 284-4 to the CPU 212 via the data bus 211.

In step S57, the CPU 212 generates display images to be displayed on the screen of the LCD 231 in accordance with the screen element image files read from the optical disc 260. More specifically, the CPU 212 generates display image data by loading the screen element image files 284 read from the optical disc 260 into regions of a virtual screen for display on the screen of the LCD 231 in accordance with the arrangement information 302 included in the screen element information file 282 shown in FIG. 9. In the first processing of step S57, the CPU 212 generates display images using only the (one or more) screen element image files 284 read in step S56. However, in the second and subsequent processing of step S57, display images are generated in accordance with screen element image files that have already been read in the past processing and the screen element image files 284 read in that processing of step S56.

More specifically, since the screen element image files 284-1 to 284-4 are read in the processing of step S56 corresponding to the example shown in FIG. 14, the CPU 212 generates display image data by loading the screen element image files 284-1 to 284-4 into the corresponding regions from among the regions 431 to 438 of the virtual screen 411 shown in FIG. 14. In other words, the CPU 212 generates display image data by loading the screen element image file 284-1 into the region 432 of the virtual screen 411, loading the screen element image file 284-2 into the region 431 of the virtual screen 411, loading the screen element image file 284-3 into the region 433 of the virtual screen 411, and loading the screen element image file 284-4 into the region 434 of the virtual screen 411. The CPU 212 supplies the generated display image data to the display control unit 216 via the data bus 211.

In step S58, the display control unit 216 controls display images based on the display image data supplied from the CPU 212 via the data bus 211 to be displayed on the screen of the LCD 231. By this processing, for example, in accordance with the example shown in FIG. 14, images (display images) shown in FIG. 15 are displayed.

Figure 15:
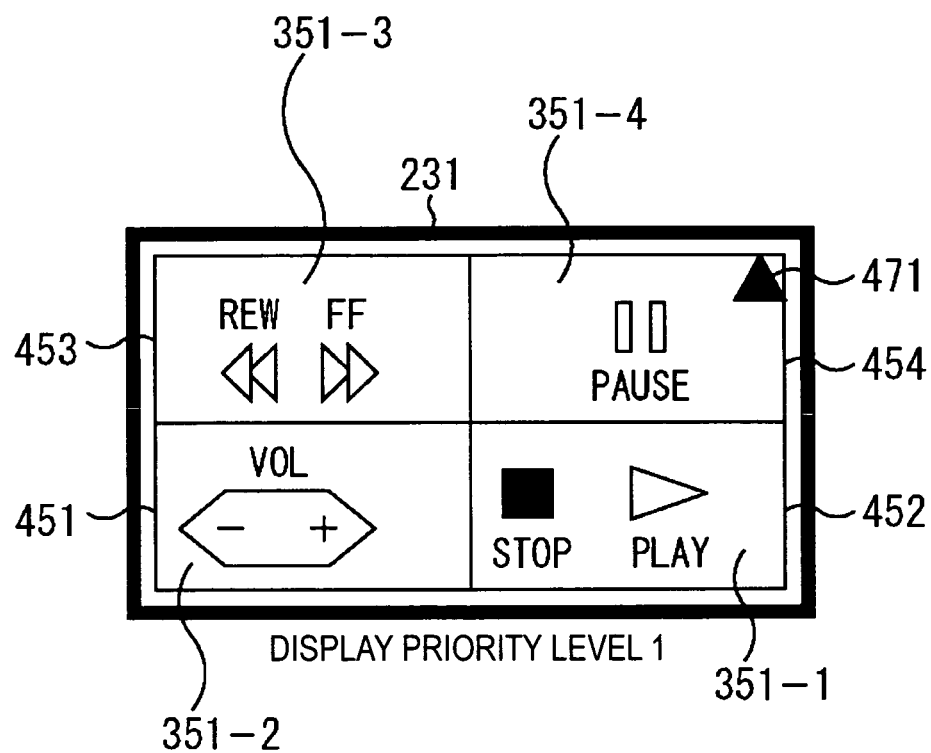
FIG. 15 shows an example of a screen actually displayed on the LCD shown in FIG. 7 with respect to the assumed virtual screen shown in FIG. 14.

In the example shown in FIG. 15, the screen of the LCD 231 is divided into the regions 451 to 454, and screen element images 351-2, 351-1, 351-3, and 351-4 of the corresponding screen element image files 284 are displayed in the regions 451, 452, 453, and 454, respectively. In other words, images of screen element image files arranged and loaded in the virtual screen 411 of the LCD 231 shown in FIG. 14 by the foregoing processing are displayed on the actual screen of the LCD 231. In addition, in this case, as is clear by referring to the virtual screen 411 shown in FIG. 14, since screen element images that are not displayed exist, the CPU 212 displays a scroll key 471 for moving up the screen on the screen of the LCD 231 (in other words, when generating display image data, the CPU 212 also generates information on the scroll key 471 and a scroll key 472 (see FIG. 17)). As described above, since only files of screen element images to be actually displayed on the screen of the LCD 231 are selected in step S54 and read in step S55, the amount of information read from the optical disc 260 is reduced. In other words, data in a region that need not be displayed in that processing, that is, image data corresponding to the regions 435 to 438 shown in FIG. 14 (the screen element image files 284-5 to 284-8) need not be read.

Referring back to FIG. 13, in step S59, the touch sensor 217 determines whether or not a user operation is input. More specifically, when the user selects (using his/her finger or a touch pen) a screen element image (from among the regions 451 to 454) or the scroll key 471 displayed on the screen of the LCD 231, the touch sensor 217 detects the selection via the touch panel 232 that is provided so as to be superimposed over the LCD 231. The touch sensor 217 reports to the CPU 212 via the data bus 211 the detected position on the screen of the LCD 231 (actually, the position on the touch panel 232).

If it is determined in step S59 that a user operation is input, the CPU 212 determines whether or not the input user operation is a scrolling operation in step S60. More specifically, the CPU 212 identifies the input user operation in accordance with the position on the touch panel 232 detected by the touch sensor 217 and determines whether or not the identified operation is an operation for selecting the scroll key 471.

If it is determined in step S60 that the input operation is a scrolling operation, the process proceeds to step S61. In step S61, the CPU 212 detects a scrolling direction. For example, the CPU 212 determines whether the user instructs upward scroll or downward scroll. In the example shown in FIG. 15, if an operation for selecting the scroll key 471 is input, it is determined that upward scroll is instructed. Then, the process returns to step S55 and the subsequent processing is repeated.

Figure 16:
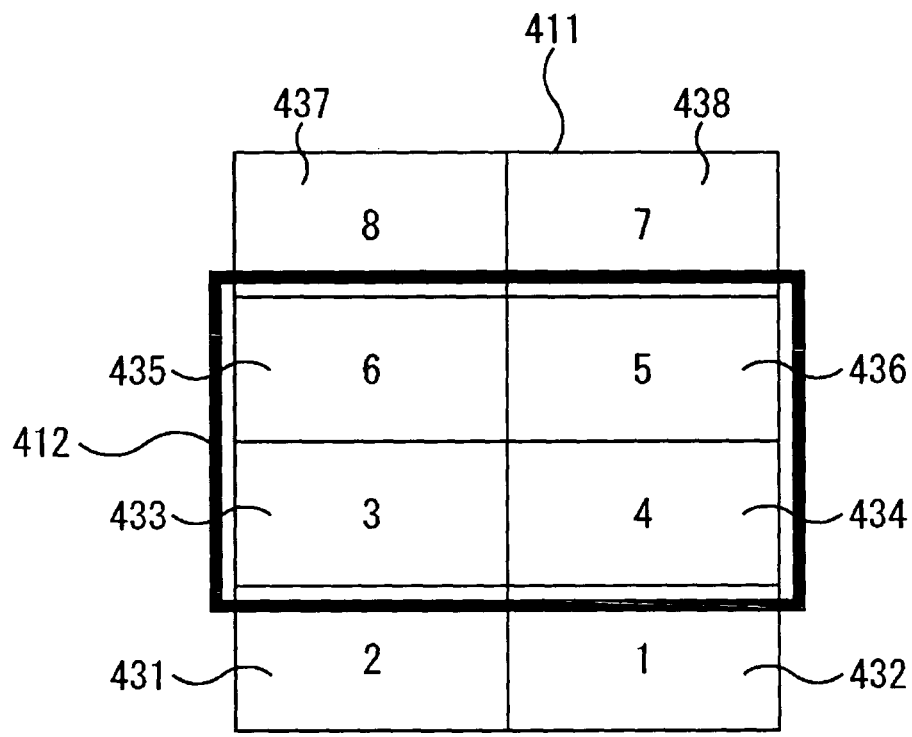
FIG. 16 shows an example of an assumed virtual screen.
Figure 17:
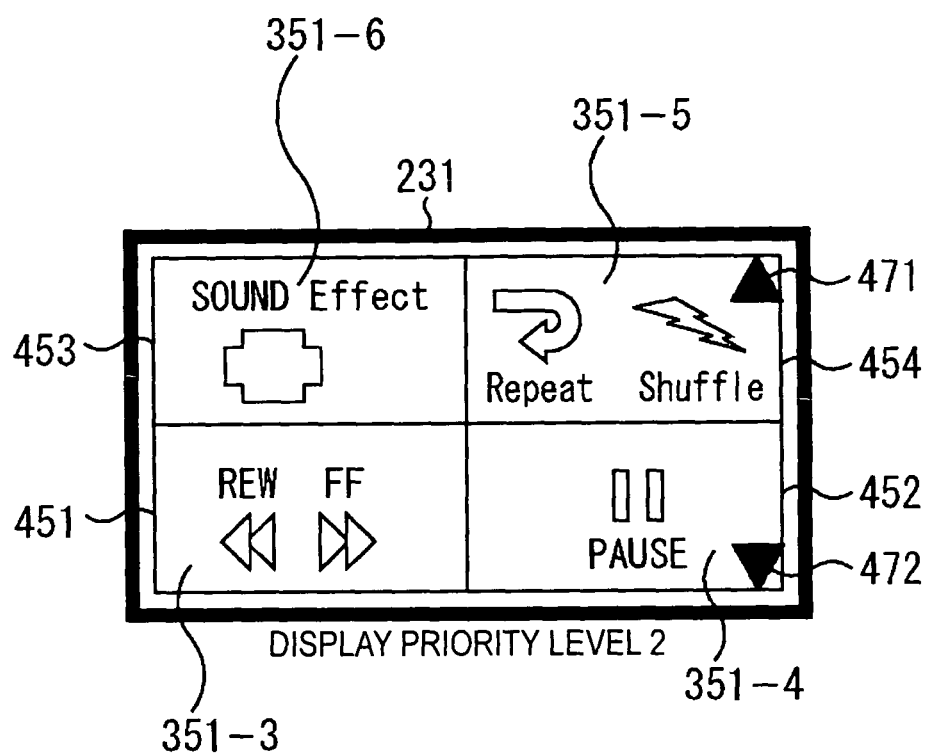
FIG. 17 shows an example of a screen actually displayed on the LCD shown in FIG. 7 with respect to the assumed virtual screen shown in FIG. 16.

More specifically, in the second processing of step S55, image elements to be newly read are selected in accordance with the screen element information file 282. If the scroll key 471 is selected in the example shown in FIG. 15, the CPU 212 checks the priority levels of the regions 435 and 436 of the corresponding virtual screen 411 (see FIG. 14), and identifies screen element image file names corresponding to the priority levels by referring to the screen element information 301 shown in FIG. 9. In this example, since the priority level of the region 435 is "6", the sixth-priority screen element image file name is "F6.bmp". In addition, since the priority level of the region 436 is "5", the fifth-priority screen element image file name is "F5.bmp". Since screen element image files corresponding to the screen element image file names "F5.bmp" and "F6.bmp" have not been read, the CPU 212 selects the screen element image file names "F5.bmp" and "F6.bmp" as screen element image file names to be newly read in the second processing of step S55. In the second processing of step S56, the CPU 212 reads the screen element image files 284-5 and 284-6 corresponding to the selected screen element image file names. In step S57, the CPU 212 generates display image data in accordance with the read screen element image files. At this time, the CPU 212 assumes the virtual screen 411 shown in FIG. 16. In other words, by the first scrolling operation, the position of the actual display area 412 is changed as shown in FIG. 16. More specifically, it is assumed that the display area 412 is located in an area including the regions 433 to 436. The CPU 212 generates display image data in accordance with the screen element image files corresponding to the screen element image file names "F3.bmp" and "F4.bmp" that have already been read in the first processing of step S56 and the screen element image files corresponding to the screen element image file names "F5.bmp" "F6.bmp" that are newly read in the second processing of step S56. At this time, the screen element image files 284-1 and 284-2, which are not used as display image data in that processing, are deleted from the SDRAM 213. Then, in the second processing of step S58, a screen shown in FIG. 17 is displayed on the screen of the LCD 231. In the example shown in FIG. 17, as is clear by referring to the virtual screen 411 shown in FIG. 16, screen element images that are not displayed exist above and below the virtual screen 411. Thus, the scroll key 471 for moving up the screen and the scroll key 472 for moving down the screen are displayed (in other words, when generating display image data, the CPU 212 also generates information on the scroll keys 471 and 472).

If an operation is input in the second processing of step S59 and the operation is a scrolling operation, a scrolling direction is detected in the second processing of step S61. Here, if downward scrolling is instructed, that is, if the scroll key 472 shown in FIG. 17 is selected, the screen element image files 284-1 and 284-2, which are deleted by the second processing of step S55, are determined as screen element image files to be newly read in the third processing of step S55. Then, in the third processing of step S57, display image data is generated. In the third processing of step S58, display images the same as the display images displayed by the first processing of step S58 are displayed on the screen of the LCD 231, as shown in FIG. 15.

If the SDRAM 213 has a sufficient storage capacity, the screen element image files 284-1 and 284-2, which are once read, and display image data generated using the screen element image files 284-1 to 284-4 (display image data generated in the first processing of step S57) may be stored in the SDRAM 213. In such a case, the number of processing times performed by the CPU 212 to generate display image data and the number of reading times of the screen element image files 284 can be reduced.

Figure 18:
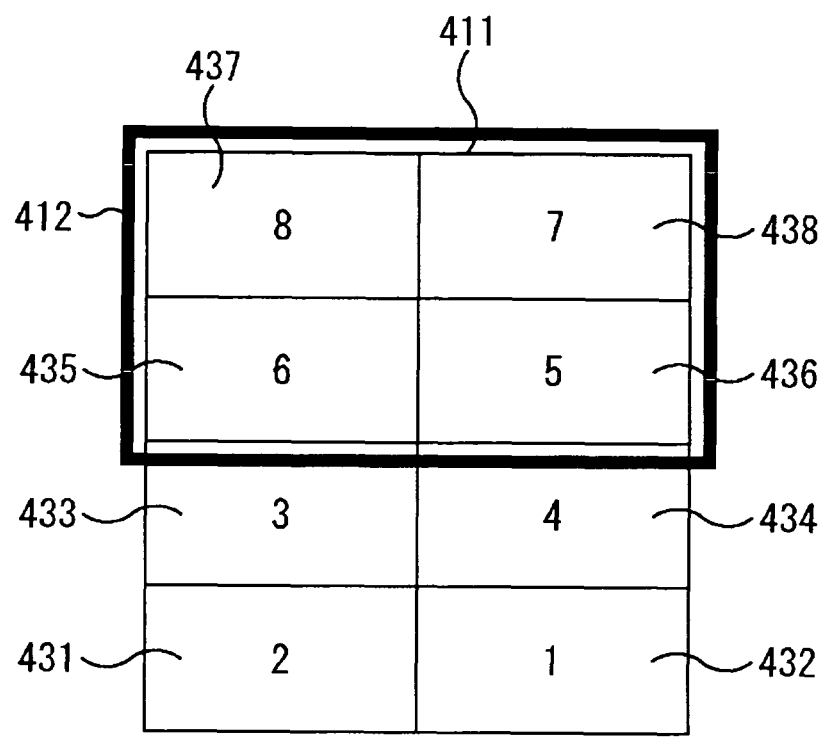
FIG. 18 shows an example of an assumed virtual screen.
Figure 19:
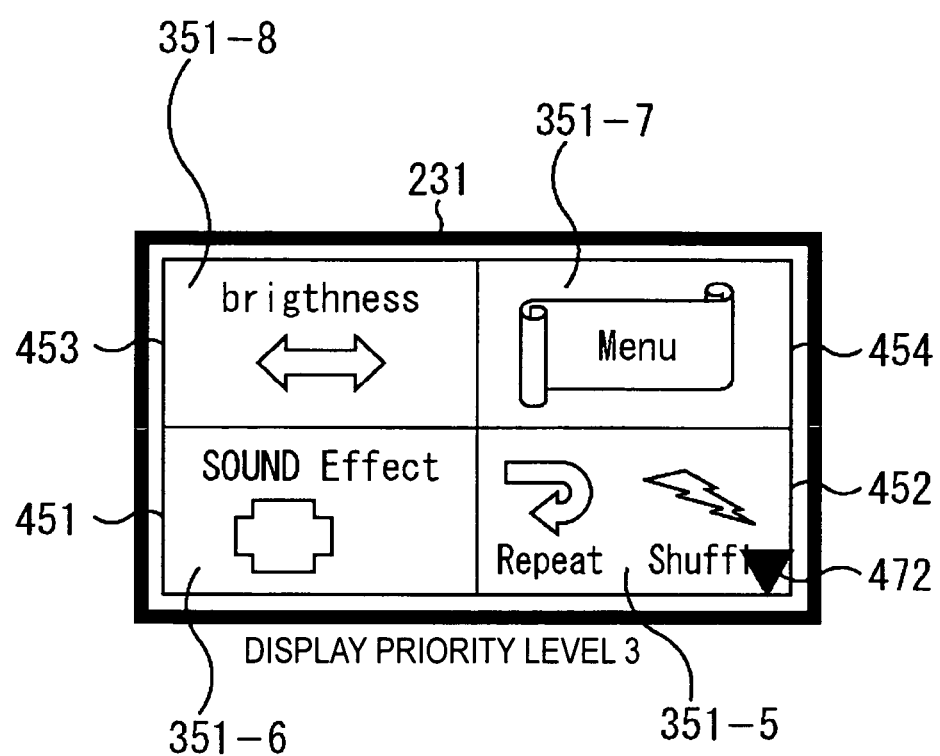
FIG. 19 shows an example of a screen actually displayed on the LCD shown in FIG. 7 with respect to the assumed virtual screen shown in FIG. 18.

In contrast, if upward scrolling is detected in step S61, that is, if the scroll key 471 shown in FIG. 17 is selected, the screen element image file names "F7.bmp" and "F8.bmp" are selected as screen element image file names to be newly read in the third processing of step S55. Then, in step S56, the screen element image files 284-7 and 284-8 are read. In step S57, display image data is generated in accordance with the read screen element image files 284-7 and 284-8. At this time, the CPU 212 assumes the virtual screen 411 shown in FIG. 18. In other words, the position of the actual display area 412 is changed as shown in FIG. 18. More specifically, it is assumed that the display area 412 is located in an area including the regions 435 to 438. The CPU 212 generates display image data in accordance with the screen element image files corresponding to the screen element image file names "F5.bmp" and "F6.bmp" that have already been read in the second processing of step S56 and the screen element image files corresponding to the screen element image file names "F7.bmp" and "F8.bmp" that are read in the third processing of step S56. In the third processing of step S58, a screen shown in FIG. 19 is displayed on the LCD 231. In the example shown in FIG. 19, as is clear by referring to the virtual screen 411 shown in FIG. 18, screen element images that are not displayed exist below the virtual screen 411, the scroll key 472 for moving down the screen is displayed (in other words, when generating display image data, the CPU 212 also generates the scroll key 472).

As described above, if the size of a screen of the LCD 231 actually displayed is smaller than the size of the virtual screen 411 formed by two columns and four rows, part of the 2×4 virtual screen arrangement when all the screen element images are displayed is appropriately displayed on the screen of the LCD 231. As a result, in this example, three patterns (the pattern shown in FIG. 15 (the pattern of display priority level 1), the pattern shown in FIG. 17 (the pattern of display priority level 2), the pattern shown in FIG. 19 (the pattern of display priority level 3) exist as display patterns. The user is able to select a pattern by designation using the scroll key 471 or 472. In addition, higher priority can be put to images that are first displayed on the LCD 231 (in FIG. 15, screen element images having the priority levels 1, 2, 3, and 4 are displayed).

As described above, since only screen element image files to be displayed on the screen of the LCD 231 are read in accordance with the screen element information file 282, unnecessary reading of a screen element image file not to be displayed can be prevented.

Referring back to FIG. 13, if it is determined in step S60 that an operation other than a scrolling operation is input, in other words, that a screen element image is selected, the process proceeds to step S62. In step S62, the CPU 212 shifts the operation so as to correspond to the input user operation. For example, if the user selects the region 452 shown in FIG. 14, the CPU 212 acquires a corresponding function from the screen element information file 282 (see FIG. 9) in accordance with positional information acquired from the touch sensor 217. If the music file 283 is not reproduced, the CPU 212 controls each unit to perform processing, such as starting to reproduce the music file.

After the processing in step S62 or if it is determined in step S59 that no operation is input, the process proceeds to step S63. In step S63, the CPU 212 determines whether or not to terminate the process. For example, the CPU 212 determines whether or not the user instructs to turn off the power. If it is determined in step S63 that the process is not to be terminated, the process returns to step S59 and the subsequent processing is repeated. If it is determined in step S63 that the process is to be terminated, the process is terminated.

Figure 12:
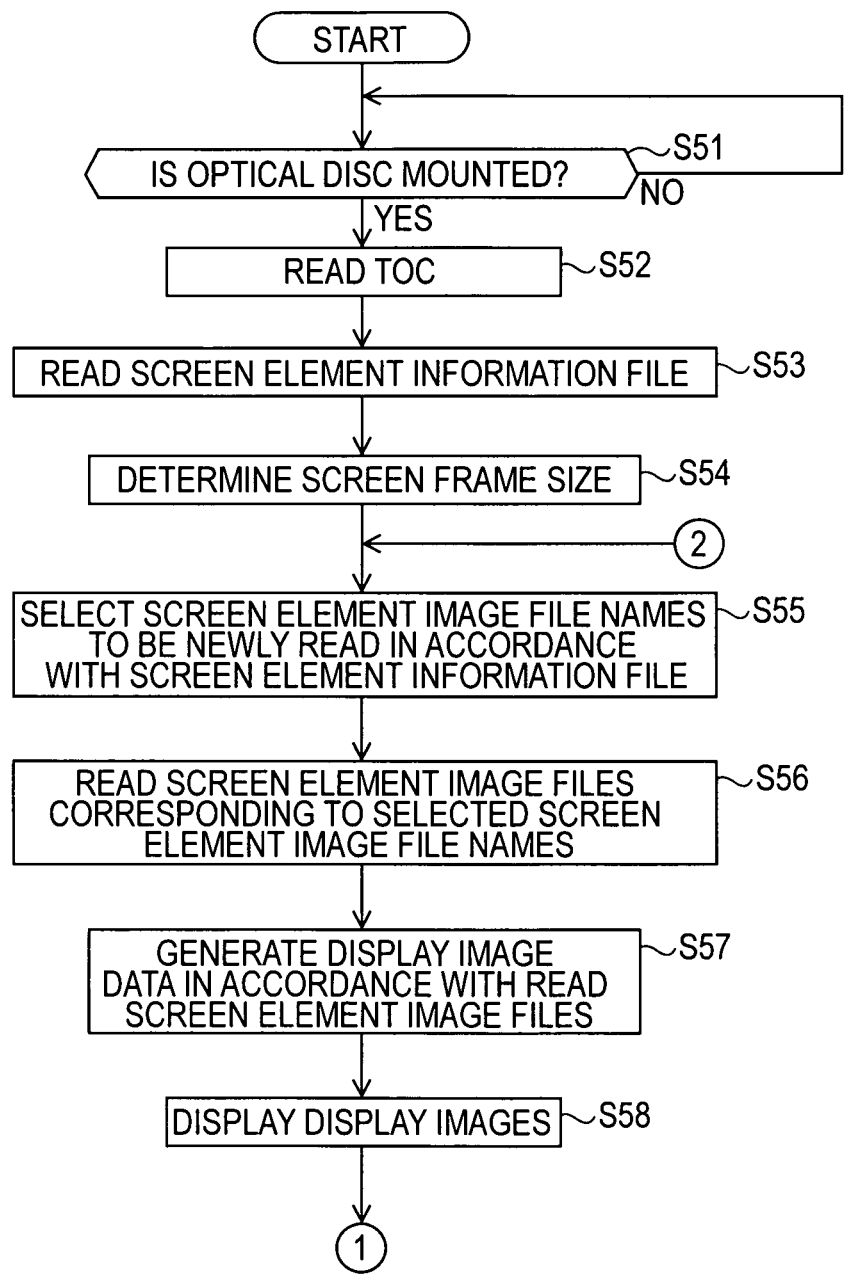
FIG. 12 is a flowchart of a display process performed by the portable information processing apparatus shown in FIG. 7.
Figure 13:
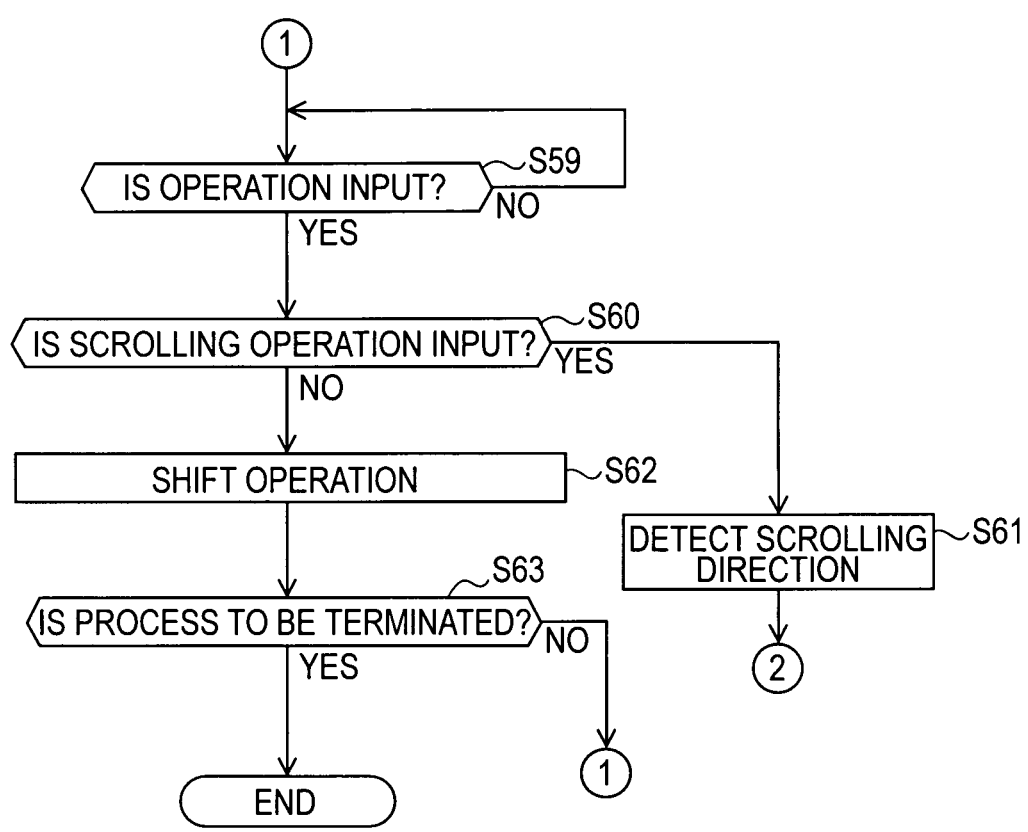
FIG. 13 is a flowchart of the display process performed by the portable information processing apparatus shown in FIG. 7.

Since file names of screen element image files to be newly read are selected and only the screen element image files corresponding to the selected screen element image file names are read in the processing shown in FIGS. 12 and 13, the amount of information read from the optical disc 260 can be reduced.

In other words, even if the storage capacity of the SDRAM 213 of the portable information processing apparatus 201 for generating display images is equal to a display screen size of the LCD 231, a corresponding screen element image file can be read and displayed from the optical disc 260 for each instruction for a scrolling operation.

In the processing shown in FIGS. 12 and 13, in step S54, the arrangement (screen frame size) of images of the screen element image files 284 on the LCD 231 is determined in accordance with the arrangement information 302 included in the screen element information file 282 read in step S53 and the size of the LCD 231 of the portable information processing apparatus 201. In step S55, the screen element image files 284 to be newly read are determined (selected) in accordance with the screen element information 301. In step S56, the determined screen element image files 284 are read from the optical disc 260 in accordance with the screen element image file names (data identifying the screen element image files) included in the screen element information 301. In step S57, the read screen element image files 284 are arranged in accordance with the determined arrangement of the images of the screen element image files 284 on the LCD 231, and display image data to be displayed on the LCD 231 is generated. In step S58, display images based on the display image data are displayed on the LCD 231.

Accordingly, since only a necessary screen element image file 284 is appropriately read, the amount of memory and the processing capability necessary for generating display image data to be displayed on the LCD 231 can be reduced.

In addition, although a case where the screen frame size is (2, 2) has been described with reference to FIGS. 14 to 19, other screen frame sizes can be set. A specific example will be given below.

Figure 20A:
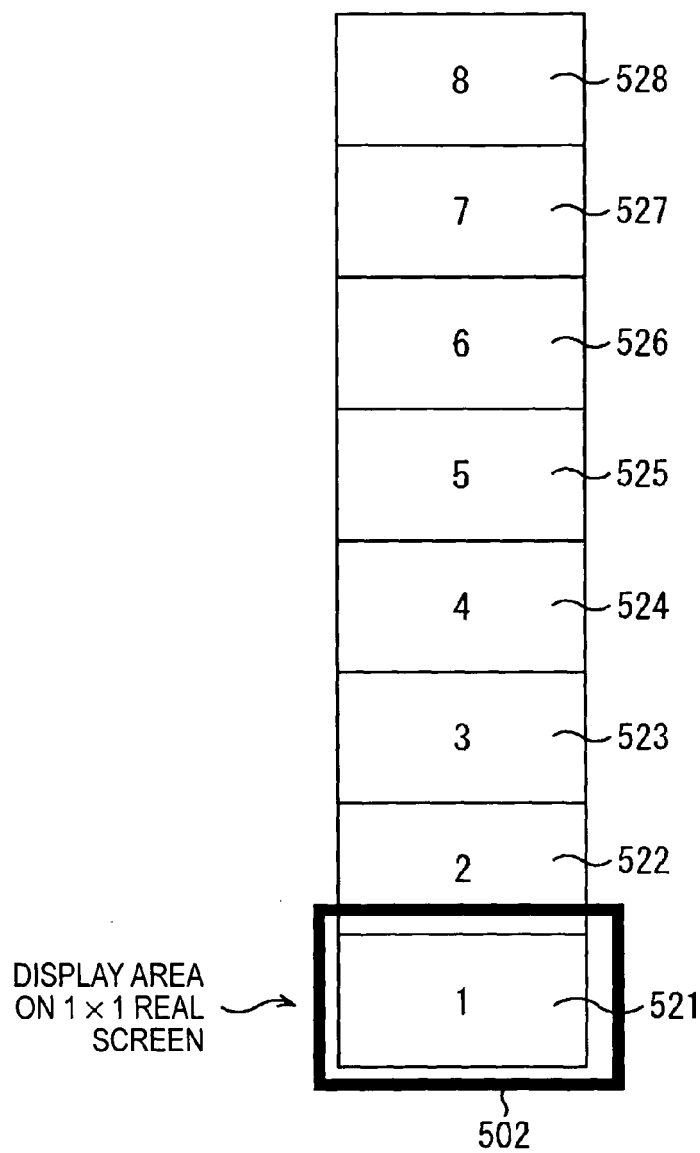
FIG. 20A shows an example of an assumed virtual screen.
Figure 20B:
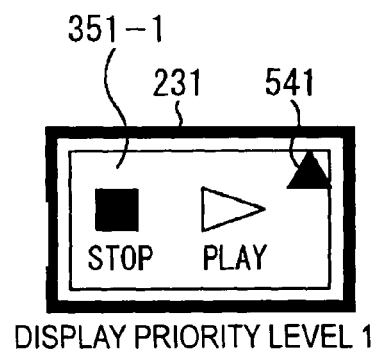
FIG. 20B shows an example of a screen actually displayed on the LCD shown in FIG. 7 with respect to the assumed virtual screen shown in FIG. 20A.

FIG. 20A shows an example of a virtual screen assumed when the screen frame size is (1, 1) and the arrangement information 302 is not defined. Here, since a plurality of screen elements is not displayed on a screen, no arrangement information is necessary. Thus, display is performed in accordance with a priority level corresponding to a screen element image file name. In the example shown in FIG. 20A, priority levels 1 to 8 are applied in that order to regions 521 to 528 of a virtual screen 501 having the 1×8 virtual screen arrangement (that is, a virtual screen divided into the eight (1×8) regions 521 to 528). Since the actual display area on the screen of the LCD 231 is arranged by one column and one row, a display area on the real screen is provided as a display area 502. In other words, although the 1×8 virtual screen 501 is assumed, only the display area 502 is actually displayed on the screen of the LCD 231. In other words, in the example shown in FIG. 20A, an image shown in FIG. 20B is actually displayed on the screen of the LCD 231. In FIG. 20B, a screen element image 351-1 is displayed on the LCD 231. In addition, a scroll key 541 used for upward scroll is displayed so as to be superimposed on the screen element image 351-1.

Figure 21A:
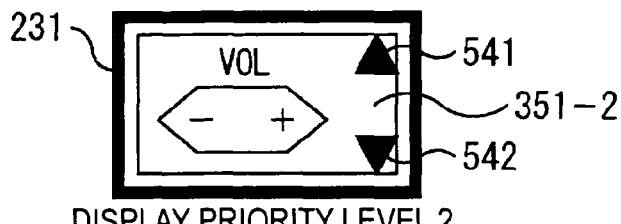
FIGS. 21A to 21G show examples of screens actually displayed on the LCD shown in FIG. 7 with respect to the assumed virtual screen shown in FIG. 20A.

If the scroll key 541 is selected on the screen shown in FIG. 20B, the screen element image file 284-2 is newly read, and a screen shown in FIG. 21A is displayed. A screen element image 351-2 is displayed on the screen of the LCD 231 shown in FIG. 21A. In addition, a scroll key 542 for downward scroll, as well as the scroll key 541, is displayed on the screen of the LCD 231 shown in FIG. 21A.

Figure 21B:
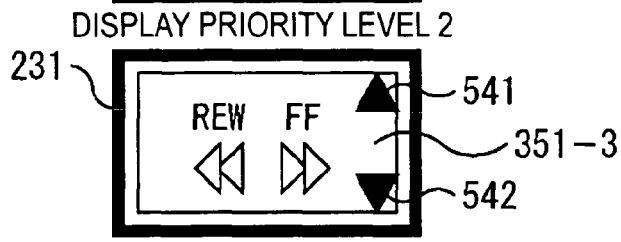

If the scroll key 541 is selected on the screen shown in FIG. 21A, the screen element image file 284-3 is newly read, and a screen shown in FIG. 21B is displayed. A screen element image 351-3 and the scroll keys 541 and 542 are displayed on the screen of the LCD 231 shown in FIG. 21B.

Figure 21C:
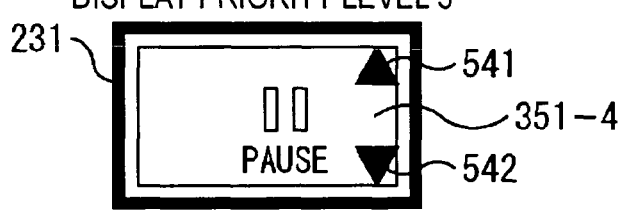

If the scroll key 541 is selected on the screen shown in FIG. 21B, the screen element image file 284-4 is newly read, and a screen shown in FIG. 21C is displayed. A screen element image 351-4 and the scroll keys 541 and 542 are displayed on the screen of the LCD 231 shown in FIG. 21C.

Figure 21D:
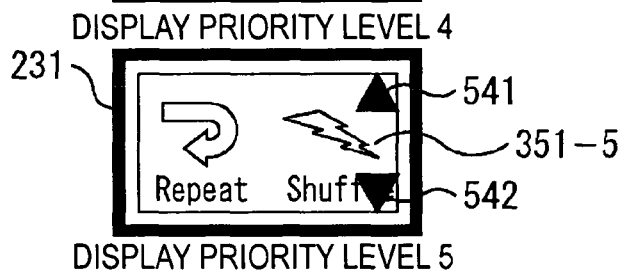

If the scroll key 541 is selected on the screen shown in FIG. 21C, the screen element image file 284-5 is newly read, and a screen shown in FIG. 21D is displayed. A screen element image 351-5 and the scroll keys 541 and 542 are displayed on the screen of the LCD 231 shown in FIG. 21D.

Figure 21E:
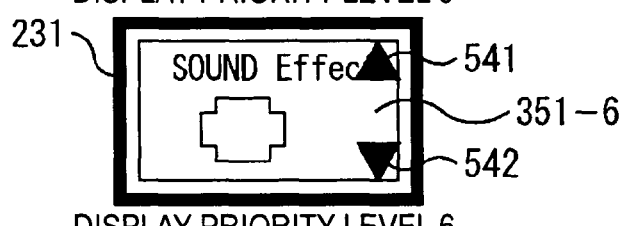

If the scroll key 541 is selected on the screen shown in FIG. 21D, the screen element image file 284-6 is newly read, and a screen shown in FIG. 21E is displayed. A screen element image 351-6 and the scroll keys 541 and 542 are displayed on the screen of the LCD 231 shown in FIG. 21E.

Figure 21F:
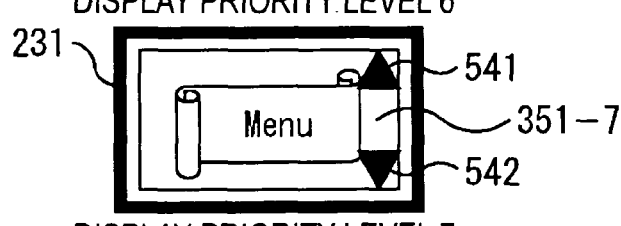

If the scroll key 541 is selected on the screen shown in FIG. 21E, the screen element image file 284-7 is newly read, and a screen shown in FIG. 21F is displayed. A screen element image 351-7 and the scroll keys 541 and 542 are displayed on the screen of the LCD 231 shown in FIG. 21F.

Figure 21G:
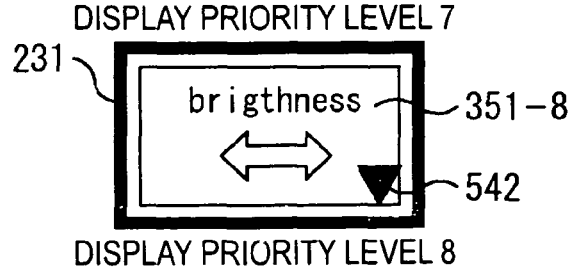

If the scroll key 541 is selected on the screen shown in FIG. 21F, the screen element image file 284-8 is newly read, and a screen shown in FIG. 21G is displayed. A screen element image 351-8 and the scroll key 542 are displayed on the screen of the LCD 231 shown in FIG. 21G. In this case, since no screen element image to be displayed exists above the screen, the scroll key 541 is not displayed.

As described above, since only a minimum screen element image file necessary for display is appropriately read from the optical disc 260 in accordance with the screen element information file 282, an operation can be performed even in a portable apparatus, such as the portable information processing apparatus 201, that is, even in an apparatus having certain constraints, such as a small size of a display device and a small amount of a buffer memory used for display on the display device.

Figure 22:
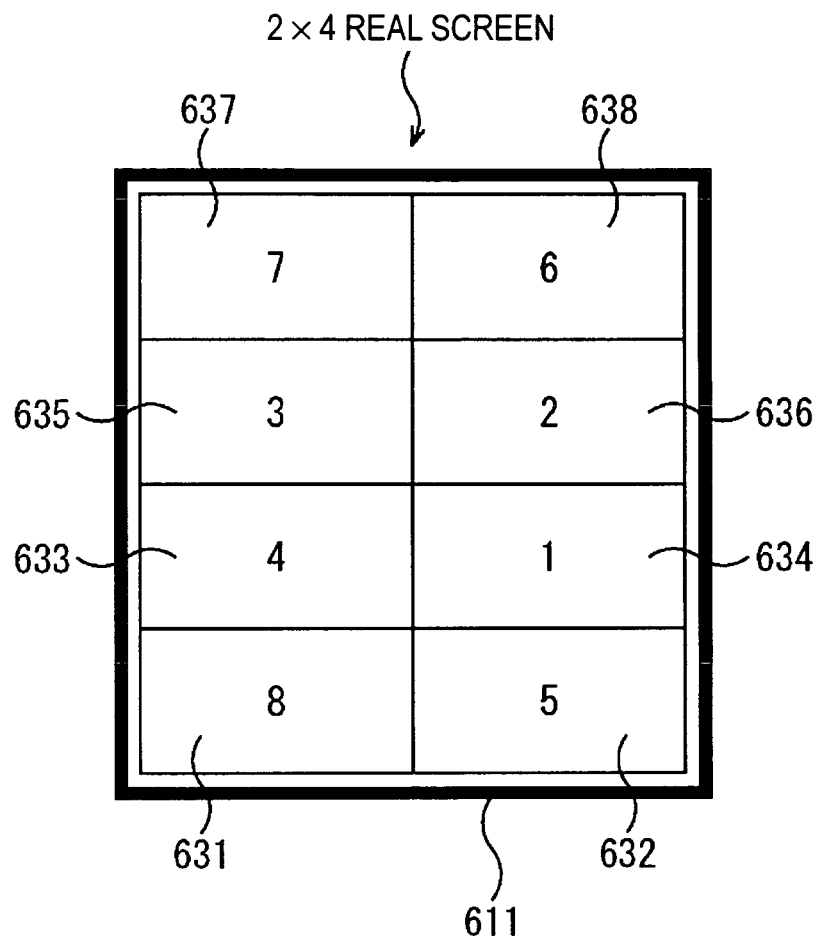
FIG. 22 shows an example of a virtual screen assumed for display on a display unit of an information processing apparatus.

If the optical disc 260 is reproduced by an information processing apparatus, such as a personal computer, in other words, if the optical disc 260 is reproduced by an apparatus including a display device larger than that of a portable information processing apparatus and a larger amount of a buffer memory used for display on the display device, a virtual screen 611 having a screen frame size (2, 4) can be assumed, as shown in FIG. 22.

In the example shown in FIG. 22, priority levels represented as a screen arrangement in the screen element information 301 are applied to regions 631 to 638 of the virtual screen 611 having the 2×4 virtual screen arrangement in accordance with a screen frame size (2, 4). In this case, the screen frame size is equal to the screen arrangement (2×4) of the virtual screen 611. In addition, the numbers "8, 5, 4, 1, 3, 2, 7, 61" written in the regions 631 to 638, respectively, shown in FIG. 22 are equal to the arrangement represented as the screen arrangement in the screen element information 301 (see FIG. 9). That is, a virtual display area corresponds to an area actually displayed on the screen of an LCD of an information processing apparatus. In other words, the display size of an LCD (of an information processing apparatus (not shown)) is equal to the display size for all the screen elements. Thus, display on the screen of the LCD can be performed as described in the arrangement information, and all the screen element images can be displayed on the screen of the LCD.

Figure 23:
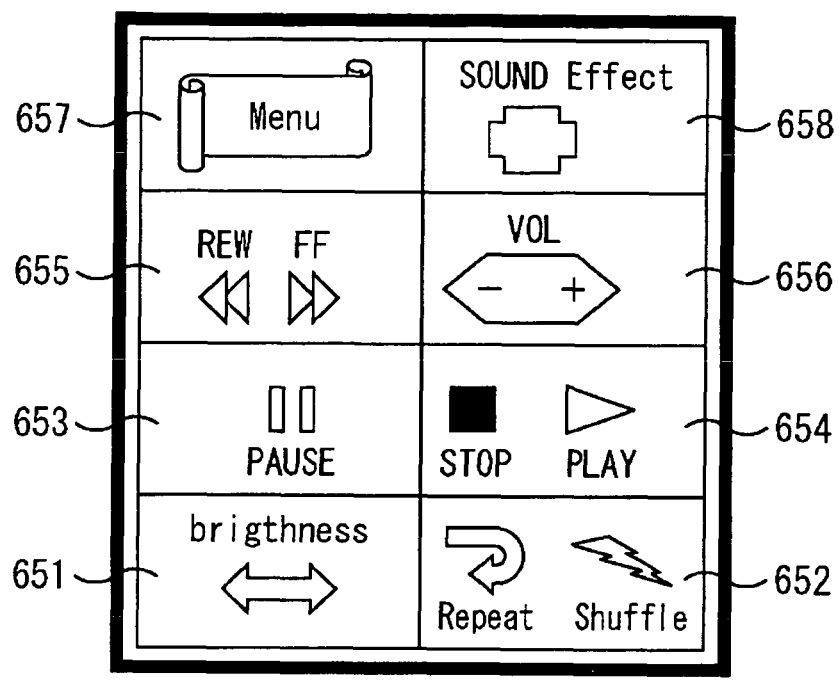
FIG. 23 shows an example of a screen actually displayed on the display unit of the information processing apparatus with respect to the assumed virtual screen shown in FIG. 22.

More specifically, images shown in FIG. 23 are displayed on the screen of the LCD (of the information processing apparatus (not shown)). In FIG. 23, screen element images 351-8, 351-5, 351-4, 351-1, 351-3, 351-2, 351-7, and 351-6 defined by the screen element information 301 are displayed in the regions 651 to 658, respectively, on the screen of the LCD. In this case, since all the screen element image files are read, no scroll key is displayed. As described above, when the optical disc 260 is reproduced by an information processing apparatus including an LCD having a large display area, all the screen element image files 284 can be displayed on a screen.

When all the screen element image files 284 can be displayed in a display area of an LCD or when an information processing apparatus (not shown) has a buffer memory used for displaying an image having a sufficient storage capacity, all the screen element image files 284 may be read in advance into the buffer memory (not shown) from the optical disc 260 in the initial stage of the process (for example, in step S55 in FIG. 12). In such a case, when an operation is input, reading of the music file 283 or the like is appropriately performed as processing corresponding to the operation.

According to the second embodiment, the portable information processing apparatus 201 reads the screen element information file 282 including the screen element information 301 in which screen element image file names that identify the screen element image files 284 each indicating a screen element, functions indicating processing corresponding to the screen element image files, and priority levels of the screen element image files are associated with each other and the arrangement information 302 in which screen frame sizes and screen arrangements of images of the screen element image files 284 corresponding to the priority levels are associated with each other. An arrangement (screen frame size) of the images of the screen element image files 284 on the LCD 231 is determined in accordance with the arrangement information 302 included in the screen element information file 282 and the size of the LCD 231 of the portable information processing apparatus 201. Screen element image files 284 to be newly read are selected in accordance with the screen element information 301. The screen element image files 284 are read from the optical disc 260 in accordance with the screen element image file names included in the screen element information 301. The read screen element image files 284 are arranged in accordance with the determined arrangement of the images of the screen element image files 284 on the LCD 231. Display image data to be displayed on the LCD 231 is generated, and display images are displayed on the LCD 231. Thus, images for receiving operations can be dynamically displayed on the display unit of the portable information processing apparatus 201.

In other words, the portable information processing apparatus 201 including a touch panel interface (that is, the touch panel 232 and the touch sensor 217) reads a function of a screen element image, which is a so-called icon (key), a priority level (that is, information identifying a position for display on the screen) of the screen element image, and a screen element image file (a design) recorded on the optical disc 260, displays the image, which is a so-called icon or the like, for receiving an operation on the screen of the LCD 231, and receives a user operation. Thus, a screen for receiving an operation can be variably displayed. In other words, dynamic operability of the portable information processing apparatus 201 can be achieved.

In addition, since the screen element information file 282 is stored on the optical disc 260 in association with the TOC 281, reading of the screen element information file 282 can be readily performed. The screen element information file 282 may not be associated with the TOC 281 as long as the screen element information file 282 is recorded as part of disc contents information.

In addition, a screen can be variably displayed in accordance with the size of a display screen of the LCD 231 of the portable information processing apparatus 201.

In addition, since priority levels are provided to respective screen element image files and display is performed in accordance with the priority levels, a screen element image with a higher priority can be preferentially displayed on the screen of the LCD 231.

In addition, a configuration that allows an easier user operation can be achieved by providing a scroll key for switching display when all the screen element images are not displayed on the screen of the LCD 231. The scroll key may be provided on the portable information processing apparatus 201 as a key in terms of hardware. Alternatively, the scroll key may be displayed in a predetermined position on the display screen as a button, such as an arrow.

Generally, as the portable information processing apparatus 201, apparatuses including a display unit having various shapes (for example, the LCD 31) are available. If a recommended arrangement (see FIG. 9) corresponding to a typical screen size is determined, a user interface used between different apparatuses can be standardized.

As describe above, by using the screen element information file 282, when information on screen elements is recorded on a disc, only a minimum screen element image file necessary for display can be read from the optical disc 260 for each instruction for a scrolling operation. Thus, an operation can be performed even in an apparatus, such as hardware provided in a battery-powered portable apparatus, having certain constraints, such as a small size of a display device and a small amount of a buffer memory used for display on the display device.

In addition, although the optical disc 260 is used as a recording medium in the foregoing embodiment, another type of recording medium may be used as long as the recording medium is capable of recording information. Furthermore, the portable information processing apparatus 201 may be a movie player, a still image player/recorder, or a portable information processing apparatus that reproduces a ROM/RAM disc/silicon memory.

In addition, the features of the first embodiment and the second embodiment may be combined appropriately. More specifically, the screen element images 351-1 to 351-4 shown in FIG. 15 may be variably displayed on the screen of the LCD 231, as described in the first embodiment, in accordance with the track number of the music file 83 being reproduced and conditions (a temperature, reproduction time, and the like). In this case, conditions are further added to the table (the screen element information 301) shown in FIG. 9 in which priority levels, functions, and screen element image file names are associated with each other.

Processing performed by an information provider that distributes (supplies) the optical disc 60 or the optical disc 260 is described next.

For example, the information provider performs processing using a personal computer 800 shown in FIG. 24 to record the information described with reference to FIG. 2 on the optical disc 60 or to record the information described with reference to FIG. 8 on the optical disc 260.

Figure 24:
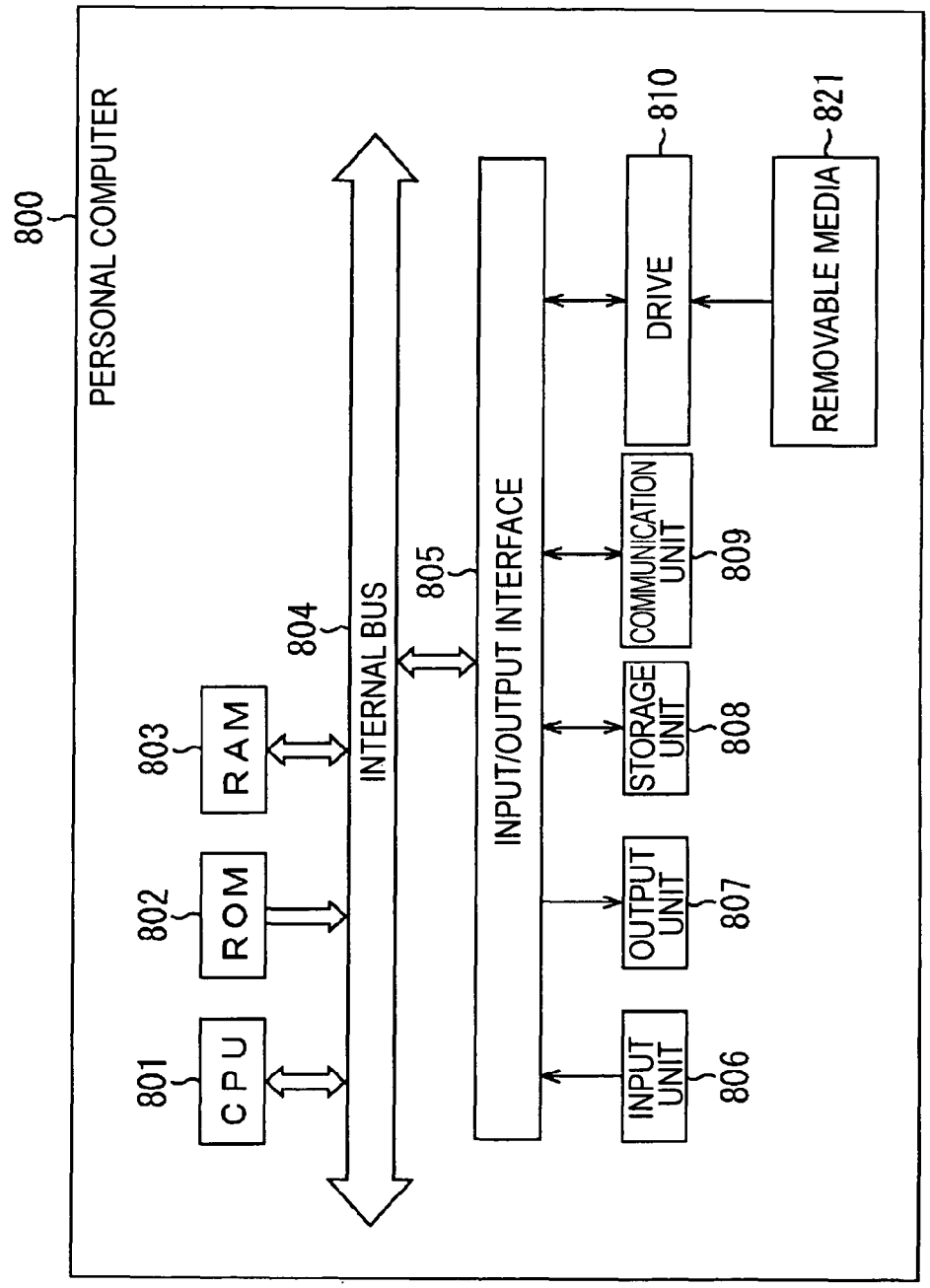
FIG. 24 is a block diagram showing an example of the structure of a personal computer.

In FIG. 24, a CPU 801 performs various types of processing in accordance with a program stored in a ROM 802 and a program loaded from a storage unit 808 into a RAM 803. The RAM 803 also stores therein data necessary for the CPU 801 to perform various types of processing.

The CPU 801, the ROM 802, and the RAM 803 are connected to each other via an internal bus 804. An input/output interface 805 is connected to the internal bus 804.

An input unit 806 including a keyboard, a mouse, and the like, an output unit 807 including a display, such as a cathode-ray tube (CRT) or an LCD, and a speaker, the storage unit 808 including a hard disc, and a communication unit 809 including a modem, a terminal adapter, and the like are connected to the input/output interface 805. The communication unit 809 performs communication processing via various networks including a telephone line and a community antenna television (CATV) system.

A drive 810 is connected to the input/output interface 805 according to need. Removable media 821 including a magnetic disc, an optical disc, a magnetic-optical disc, and a semiconductor memory are appropriately mounted. A computer program read from the removal media 821 is installed into the storage unit 808 according to need.

The 800 generates the key information file 82 described with reference to FIG. 3 in accordance with an operation input to the input unit 806 by the user (information provider), and the generated key information file 82 is recorded on the optical disc 60 (not shown) mounted on the drive 810. More specifically, in accordance with a user operation input to the input unit 806, the CPU 801 generates a table (the key information file 82) in which designs of keys corresponding to respective track numbers, positions, sound, conditions, and keywords are associated with each other, and controls the optical disc (not shown in FIG. 24) mounted on the drive 810 to record the table.

Similarly, the personal computer 800 generates the screen element information file 282 described with reference to FIG. 9 in accordance with an operation input to the input unit 806 by the user (information provider), and the generated screen element information file 282 is recorded on the optical disc 260 (not shown) mounted on the drive 810. More specifically, in accordance with a user operation input to the input unit 806, the CPU 801 generates screen element image files corresponding to respective functions and a table (the screen element information file 282) in which file names of the screen element image files, functions, and priority levels are associated with each other. Then, the CPU 801 controls the optical disc 260 (not shown in FIG. 24) mounted on the drive 810 to record the screen element image files and the screen element information file 282. For example, the CPU 801 assigns images corresponding to the functions displayed on the output unit 807 to blocks. The CPU 801 also puts priorities to the images in accordance with an operation input to the input unit 806. The CPU 801 generates a table (the screen element information file 282) in which functions corresponding to the respective blocks, images displayed on the respective blocks, and names of the images are associated with each other. The CPU 801 controls the optical disc 260 mounted on the drive 810 to record the screen element information file 282.

As described above, an information provider assigns images displayed on the output unit 807 to blocks, and puts priorities to functions corresponding to the respective blocks. Thus, the screen element information file 282 shown in FIG. 9 can be recorded on the optical disc 260 and supplied to a portable information processing apparatus. In other words, an information provider is able to record on the optical disc 260 information for dynamically displaying an image used for inputting an operation on a display unit of a portable information processing apparatus and to distribute the information to the portable information processing apparatus.

The foregoing series of processing may be performed by hardware or software. In this case, the foregoing series of processing is performed by the personal computer 800 shown in FIG. 24. If the foregoing series of processing are performed by software, a program constituting the software is installed from a network or a recording medium.

As shown in FIG. 24, the recording medium not only includes package media, such as the removable media 821, which record the program and are distributed in order to provide the program to a user independent of the computer, but also includes a hard disc including the ROM 802 or the storage unit 808 which records the program and is built in the apparatus main unit to be provided to the user.

In this specification, steps defining a computer program are not necessarily performed in chronological order in accordance with the written order. The steps may be performed in parallel or independently without being performed in chronological order.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus including a display input device in which an image display unit and an operation input unit are integrally formed, the information processing apparatus comprising:
    means for reproducing data recorded on a recording medium;
    means for retrieving key information and a table of contents from the recording medium, the key information including a plurality of icons each corresponding to a function of the information processing apparatus, and the table of contents including a list of information recorded on the recording medium and being stored on the recording medium separate from the key information;
    means for storing the key information and the table of contents that are reproduced from the recording medium;
    means for controlling the image display unit to display at least one of the plurality of icons included in the key information stored in the means for storing;
    means for determining an operator for which an operation is input based on an input content input from the operation input unit and the key information displayed on the image display unit; and
    means for reading an operation content of the information processing apparatus that is stored in the means for storing and that is defined for each operator based on a determination result of the means for determining.

2. The information processing apparatus according to claim 1, wherein the operation content of the information processing apparatus is data for controlling processing of the data recorded on the recording medium.

3. The information processing apparatus according to claim 1, wherein the plurality of icons that are recorded on the recording medium are read and displayed on the image display unit.

4. A portable information processing apparatus that performs processing based on information recorded on a recording medium, the portable information processing apparatus comprising:
    a touch panel that receives an input user operation;
    a display unit that is superimposed over the touch panel;
    first means for reading from the recording medium a table of contents including a list of information recorded on the recording medium and a screen element information file including a first table in which data identifying a plurality of screen element image files each indicating a screen element that corresponds to a function of the portable information processing apparatus, processing data indicating processing corresponding to the respective plurality of screen element image files, and priority levels of the respective plurality of screen element image files are associated with each other and a second table in which a plurality of sizes of the display unit and arrangements of images of the screen element image files on the display unit corresponding to the priority levels are associated with each other, the table of contents being stored on the recording medium separate from the screen element information file;
    means for determining an arrangement of the images of the screen element image files on the display unit based on the second table included in the screen element information file read by the first means for reading and for determining screen element image files to be newly read based on the first table;
    second means for reading from the recording medium the screen element image files determined by the means for determining based on the data identifying the screen element image files in the first table, the screen element image files being stored on the recording medium separate from the table of contents and the screen element information file;

means for arranging the screen element image files read by the second means for reading based on the arrangement of the images of the screen element image files on the display unit determined by the means for determining and for generating display image data to be displayed on the display unit; and means for controlling the display unit to display images based on the display image data generated by the means for arranging.

5. The portable information processing apparatus according to claim 4, wherein when an operation input for scrolling an image of a screen element image file included in the images displayed on the display unit is received by the touch panel, the means for determining determines screen element image files to be newly read based on the first table read by the first means for reading, the second means for reading reads from the recording medium the screen element image files determined by the means for determining as screen element image files to be newly read based on the data identifying the screen element image files in the first table, the means for arranging generates display image data to be displayed on the display unit using the screen element image files read by the second means for reading based on the arrangement of the images of the screen element image files on the display unit determined by the means for determining, and the means for controlling controls the display unit to display images based on the display image data generated by the means for arranging.

6. An information processing method, implemented on a portable information processing apparatus that performs processing based on information recorded on a recording medium and that includes a touch panel receiving an input user operation and a display unit that is superimposed over the touch panel, the information processing method comprising:

reading from the recording medium a table of contents including a list of information recorded on the recording medium and a screen element information file including a first table in which data identifying a plurality of screen element image files each indicating a screen element that corresponds to a function of the portable information processing apparatus, processing data indicating processing corresponding to the respective plurality of screen element image files, and priority levels of the respective plurality of screen element image files are associated with each other and a second table in which a plurality of sizes of the display unit and arrangements of images of the screen element image files on the display unit corresponding to the priority levels are associated with each other, the table of contents being stored on the recording medium separate from the screen element information file;

determining an arrangement of the images of the screen element image files on the display unit based on the second table included in the screen element information file read by the step of reading the screen element information file;

determining screen element image files to be newly read based on the first table;

reading from the recording medium the screen element image files determined by the step of determining the screen element image files to be newly read based on the data identifying the screen element image files in the first table, the screen element image files being stored on the recording medium separate from the table of contents and the screen element information file;

generating display image data to be displayed on the display unit by arranging the screen element image files read by the step of reading the screen element image files determined by the step of determining the screen element image files to be newly read based on the arrangement of the images of the screen element image files on the display unit determined by the step of determining the arrangement of the images of the screen element image files on the display unit; and controlling the display unit of the portable information processing apparatus to display images based on the display image data generated by the step of generating the display image data.

7. An information processing apparatus including a display input device in which an image display unit and an operation input unit are integrally formed, the information processing apparatus comprising:

a reproduction section that reproduces data recorded on a recording medium;

a retrieving section for retrieving key information and a table of contents from the recording medium, the key information including a plurality of icons each corresponding to a function of the information processing apparatus, and the table of contents including a list of information recorded on the recording medium and being stored on the recording medium separate from the key information;

a memory that stores the key information and the table of contents reproduced from the recording medium;

a display controller that controls the image display unit to display at least one of the plurality of icons included in the key information stored in the storage section;

a determination section that determines an operator for which an operation is input based on an input content input from the operation input unit and the key information displayed on the image display unit; and an operation content reading section that reads an operation content of the information processing apparatus that is stored in the storage section and that is defined for each operator based on a determination result of the determination section.

8. A portable information processing apparatus that performs processing based on information recorded on a recording medium, the portable information processing apparatus comprising:

a touch panel that receives an input user operation;

a display unit that is provided so as to be superimposed over the touch panel;

a first reading section that reads from the recording medium a table of contents including a list of information recorded on the recording medium and a screen element information file including a first table in which data identifying a plurality of screen element image files each indicating a screen element that corresponds to a function of the portable information processing apparatus, processing data indicating processing corresponding to the respective plurality of screen element image files, and priority levels of the respective plurality of screen element image files are associated with each other and a second table in which a plurality of sizes of the display unit and arrangements of images of the screen element image files on the display unit corresponding to the priority levels are associated with each other, the table of contents being stored on the recording medium separate from the screen element information file;

a determination section that determines an arrangement of the images of the screen element image files on the display unit based on the second table included in the screen element information file read by the first reading section and that determines screen element image files to be newly read based on the first table;

a second reading section that reads from the recording medium the screen element image files determined by the determination section based on the data identifying the screen element image files in the first table, the screen element image files being stored on the recording medium separate from the table of contents and the screen element information file;

a generating section that arranges the screen element image files read by the second reading section based on the arrangement of the images of the screen element image files on the display unit determined by the determination section and that generates display image data to be displayed on the display unit; and a display controller that controls the display unit to display images based on the display image data generated by the generating section.

9. The information processing apparatus according to claim 1, wherein the recording medium is separate from the information processing apparatus.

10. The information processing apparatus according to claim 1, wherein the functions of the information processing apparatus include at least one of playing back the information recorded on the recording medium, stopping reproduction of the information recorded on the recording medium, pausing reproduction of the information recorded on the recording medium, and changing a volume of playback of the information recorded on the recording medium.

* * * * *